(12) United States Patent
Godden

(10) Patent No.: US 8,735,001 B2
(45) Date of Patent: May 27, 2014

(54) GEL FORMED BATTERY

(75) Inventor: Glenn Godden, Edmonds, WA (US)

(73) Assignee: Empire Technology Development LLC, Wilmington, DE (US)

( * ) Notice: Subject to any disclaimer, the term of this patent is extended or adjusted under 35 U.S.C. 154(b) by 0 days.

(21) Appl. No.: 13/816,366

(22) PCT Filed: Apr. 9, 2012

(86) PCT No.: PCT/US2012/032731
§ 371 (c)(1), (2), (4) Date: Feb. 11, 2013

(87) PCT Pub. No.: WO2012/139100
PCT Pub. Date: Oct. 11, 2012

(65) Prior Publication Data
US 2013/0143145 A1    Jun. 6, 2013

(30) Foreign Application Priority Data

Apr. 8, 2011  (WO) ................ PCT/US2011/031780
Jun. 6, 2011  (WO) ................ PCT/US2011/039281

(51) Int. Cl.
*H01M 6/14*  (2006.01)
(52) U.S. Cl.
USPC .......... 429/300; 429/209; 429/303; 429/218.1
(58) Field of Classification Search
USPC .............. 429/300, 303, 218.1, 209, 212, 217, 429/232, 122
See application file for complete search history.

(56) References Cited

U.S. PATENT DOCUMENTS

| | | |
|---|---|---|
| 4,055,291 A | 10/1977 | Peters |
| 4,461,403 A | 7/1984 | Prahs |
| 4,746,221 A | 5/1988 | Okumura et al. |
| 4,808,496 A | 2/1989 | Hope et al. |
| 5,020,694 A | 6/1991 | Pettengill |
| 5,569,368 A | 10/1996 | Larsky et al. |
| 6,230,052 B1 | 5/2001 | Wolff et al. |

(Continued)

FOREIGN PATENT DOCUMENTS

| | | |
|---|---|---|
| AU | 1305188 A | 9/1989 |
| AU | 2002358277 A1 | 7/2003 |

(Continued)

OTHER PUBLICATIONS

International Search Report and Written Opinion for PCT/US2011/031780 dated Sep. 15, 2011.

(Continued)

*Primary Examiner* — Raymond Alejandro
(74) *Attorney, Agent, or Firm* — Pepper Hamilton LLP

(57) ABSTRACT

A gel battery may be fabricated from a gel anode material and a gel cathode material. The battery may further comprise a gel electrolyte material. The gel materials may be in the form of thin films. A gel battery may be formed by contacting at least a portion of a gel anode with at least a portion of a gel electrolyte, and at least a portion of a gel cathode may also be in contact with at least a portion of the gel electrolyte. A battery formed by gel films may also be coated with a material. The gel battery, its anode, cathode, and electrolyte materials may all be non-toxic for an application to an animal.

19 Claims, 12 Drawing Sheets

(56) References Cited

U.S. PATENT DOCUMENTS

| | | | |
|---|---|---|---|
| 6,383,536 | B1 | 5/2002 | Palmer et al. |
| 6,395,428 | B1 | 5/2002 | Kezuka |
| 6,416,800 | B1 | 7/2002 | Weber et al. |
| 7,008,722 | B2 | 3/2006 | Huang |
| 7,378,450 | B2 | 5/2008 | Erkey et al. |
| 7,476,221 | B2 | 1/2009 | Sun et al. |
| 7,476,222 | B2 | 1/2009 | Sun et al. |
| 7,477,939 | B2 | 1/2009 | Sun et al. |
| 7,477,941 | B2 | 1/2009 | Sun et al. |
| 7,477,947 | B2 | 1/2009 | Pines et al. |
| 7,632,533 | B2 | 12/2009 | Fotland et al. |
| 8,007,935 | B2 | 8/2011 | He et al. |
| 2002/0029973 | A1 | 3/2002 | Maydan |
| 2003/0091895 | A1 | 5/2003 | Zocchi |
| 2003/0102874 | A1 | 6/2003 | Lane et al. |
| 2004/0029982 | A1 | 2/2004 | Erkey et al. |
| 2004/0070371 | A1 | 4/2004 | Chern et al. |
| 2004/0071866 | A1 | 4/2004 | Park et al. |
| 2004/0141908 | A1 | 7/2004 | Hara et al. |
| 2004/0164096 | A1 | 8/2004 | Engel et al. |
| 2005/0013862 | A1 | 1/2005 | Tobyn et al. |
| 2005/0053830 | A1* | 3/2005 | Akashi et al. ............ 429/144 |
| 2005/0089548 | A1 | 4/2005 | Virgalitto et al. |
| 2006/0261823 | A1 | 11/2006 | Parker |
| 2007/0059595 | A1* | 3/2007 | Endo et al. ............ 429/176 |
| 2007/0060862 | A1 | 3/2007 | Sun et al. |
| 2007/0111104 | A1* | 5/2007 | Shibuya ............ 429/303 |
| 2007/0123772 | A1 | 5/2007 | Euliano et al. |
| 2007/0142222 | A1 | 6/2007 | Erkey et al. |
| 2007/0236867 | A1 | 10/2007 | Hossick-Schott et al. |
| 2007/0282387 | A1 | 12/2007 | Starkebaum |
| 2007/0286929 | A1 | 12/2007 | Andersen |
| 2008/0009775 | A1 | 1/2008 | Murison |
| 2008/0050490 | A1 | 2/2008 | Stalder et al. |
| 2008/0171266 | A1 | 7/2008 | Kato et al. |
| 2008/0284599 | A1 | 11/2008 | Zdeblick et al. |
| 2009/0010998 | A1 | 1/2009 | Marchitto et al. |
| 2009/0136834 | A1 | 5/2009 | Coowar et al. |
| 2009/0270788 | A1 | 10/2009 | Marenus et al. |
| 2009/0286153 | A1 | 11/2009 | He et al. |
| 2009/0314336 | A1 | 12/2009 | Nakatani et al. |
| 2010/0055570 | A1 | 3/2010 | Rodriguez |
| 2010/0057147 | A1 | 3/2010 | Fassih et al. |
| 2010/0082088 | A1 | 4/2010 | Fassih et al. |
| 2010/0209515 | A1 | 8/2010 | Chantalat et al. |
| 2010/0239616 | A1 | 9/2010 | Hafezi et al. |
| 2010/0298668 | A1 | 11/2010 | Hafezi et al. |
| 2011/0052764 | A1 | 3/2011 | Bulgin |
| 2011/0065983 | A1 | 3/2011 | Hafezi et al. |
| 2011/0184482 | A1 | 7/2011 | Eberman et al. |
| 2012/0021014 | A1 | 1/2012 | Chantalat et al. |
| 2012/0276443 | A1* | 11/2012 | Hatta et al. ............ 429/185 |

FOREIGN PATENT DOCUMENTS

| | | |
|---|---|---|
| AU | 2008281632 A1 | 2/2009 |
| AU | 2009281876 A1 | 2/2010 |
| CA | 2734251 A | 2/2010 |
| CN | 1617765 A | 5/2005 |
| CN | 101174681 A | 5/2008 |
| CN | 101227001 A | 7/2008 |
| CN | 101174681 B | 5/2010 |
| CN | 101227001 B | 9/2011 |
| CN | 102176862 A | 9/2011 |
| EP | 1494807 A2 | 1/2005 |
| EP | 1959023 A1 | 8/2008 |
| EP | 2057703 A1 | 5/2009 |
| EP | 2173323 A2 | 4/2010 |
| EP | 1959023 B1 | 5/2010 |
| EP | 2313003 A2 | 4/2011 |
| FI | 20065423 A | 12/2007 |
| GB | 2451503 A | 2/2009 |
| GB | 2455184 A | 6/2009 |
| JP | 2004134351 A | 4/2004 |
| JP | 2005209819 A | 8/2005 |
| JP | 2006504508 A | 2/2006 |
| JP | 2007323878 A | 12/2007 |
| JP | 2008171767 A | 7/2008 |
| JP | 4199811 B2 | 12/2008 |
| JP | 2012500055 A | 1/2012 |
| KR | 20040032421 A | 4/2004 |
| KR | 20110041563 A | 4/2011 |
| MX | PA04006324 A | 3/2005 |
| TW | 200930415 A | 7/2009 |
| WO | WO 03/057367 A2 | 7/2003 |
| WO | WO2005/004981 A2 | 1/2005 |
| WO | WO2005/004983 A2 | 1/2005 |
| WO | WO2005/045977 A2 | 5/2005 |
| WO | WO2007/147942 A1 | 12/2007 |
| WO | WO2008/052136 A2 | 5/2008 |
| WO | WO2008/052394 A1 | 5/2008 |
| WO | WO2009/016350 A2 | 2/2009 |
| WO | WO2009/045720 A2 | 4/2009 |
| WO | WO2010/019778 A2 | 2/2010 |
| WO | WO2010/111511 A1 | 9/2010 |
| WO | WO2012/012509 A1 | 1/2012 |
| WO | WO2012/13854 A1 | 10/2012 |
| WO | WO2012/138352 A1 | 10/2012 |
| WO | WO2012/138361 A1 | 10/2012 |
| WO | WO2012/139100 A1 | 10/2012 |
| WO | WO2012/139107 A1 | 10/2012 |
| WO | WO2012/139109 A1 | 10/2012 |

OTHER PUBLICATIONS

International Search Report and Written Opinion for PCT/US2011/039281 dated Sep. 22, 2011.
International Search Report and Written Opinion for PCT/US2011/031783 dated Aug. 17, 2011.
International Search Report and Written Opinion for PCT/US2011/031791 dated Jul. 7, 2011.
International Search Report and Written Opinion for PCT/US2012/032731 dated Jun. 22, 2012.
International Search Report and Written Opinion for PCT/US2012/032753 dated Jul. 19, 2012.
International Search Report and Written Opinion for PCT/US2012/032757 dated May 31, 2012.
Acmella oleracea, http://en.wikipedia.org/wiki/Acmella_oleracea (Printed from Internet Jan. 9, 2013).
Benwick, Like a Taste That Tingles? Then This Bud's for You, *The Washington Post* (Oct. 3, 2007).
Cass, Battery storage could get a huge boost from seaweed, Technology Review (Sep. 8, 2011, http://www.technologyreview.com/news/425374/battery-storage-could-get-a-huge-boost-from-seaweed/.
Edible Computer Chips: Nanotechnology, http://www.ediblecomputerchips.com (Jan. 2009).
Kendrick, Tasting the Light: Device Lets the Blind "See" with Their Tongues, *Scientific American* (Aug. 13, 2009).
Lawless et al., Metallic Taste from Electrical and Chemical Stimulation, *Chem. Senses* (2005), 30(3):185-194.
Ramsewak et al., Bioactive N-Isobutylamides from the Flower Buds of *Spilanthes acmella*, (Jul. 1999), 51(6):729-732 (Abstract).
Solid-State Batteries, The Power of the Press, *The Economist* (Jan. 27, 2011), http://www.economist.com/node/18007516.
Stevens et al., A Direct Comparison of the Taste of Electrical and Chemical Stimuli, *Chem. Senses* (Mar. 2, 2008), 33:405-413.
Battery (electricity), (printed from Internet Nov. 13, 2013).
Brinn, Israeli project develops novel solution to dry mouth, Feb. 27, 2005.
Ecoupled, From the Store Shelf to Home (and Beyond), Ecoupled Wireless Power at 2011 CES, Jan. 7, 2011.
Electrochemical cell, (printed from Internet Nov. 13, 2013).
Just et al., BOLD responses to trigeminal nerve stimulation, *Magnetic Resonance Imaging*(2010), 28:1143-1151.
Pop Rocks, (printed from Internet Nov. 13, 2013).

\* cited by examiner

GEL FORMED BATTERY

REFERENCE TO RELATED APPLICATIONS

Claim of Priority

This application is a U.S. national stage filing under 35 U.S.C. §371 of International Application No. PCT/US2012/032731 filed Apr. 9, 2012 entitled "Gel Formed Battery," the disclosure of which is incorporated by reference in its entirety. International Application No. PCT/US2012/032731 filed Apr. 9, 2012 entitled "Gel Formed Battery" further claims benefit of and priority to International Application No. PCT/US2011/031780 entitled "Gel Formed Battery" filed Apr. 8, 2011 and International Application No. PCT/US2011/039281 entitled "Liquid Battery Formed From Encapsulated Components" filed Jun. 6, 2011, the disclosures of which are incorporated by reference in their entirety.

BACKGROUND

A battery is an electro-chemical device that converts chemical energy into electrical energy. A battery generally includes an anode and a cathode, which are connected by an electrolyte. The electrolyte can be a wet electrolyte or a dry electrolyte that is activated by moisture. When the battery is in operation, a redox reaction occurs. During the redox reaction, reduction occurs to cations at the cathode and oxidization occurs to anions at the anode. The battery has a terminal voltage, which is measured as the difference of voltage between the anode and cathode.

SUMMARY

In an embodiment, an electrochemical cell comprises a gel anode, a gel cathode, and a gel electrolyte, in which at least a portion of the gel anode contacts at least a portion of the gel electrolyte, at least a portion of the gel cathode contacts at least a portion of the gel electrolyte, and the electrochemical cell, the gel anode, the gel cathode, and the gel electrolyte may be non-toxic for an application to an animal.

In an embodiment, an electrochemical cell comprises a gel anode film, a gel cathode film, and a gel electrolyte film, in which at least a portion of the gel anode film contacts at least a portion of the gel electrolyte film, at least a portion of the gel cathode film contacts at least a portion of the gel electrolyte film, and the electrochemical cell, the gel anode film, the gel cathode film, and the gel electrolyte film may be non-toxic for an application to an animal.

In an embodiment, an electrochemical device comprises multiple electrochemical cells, in which each electrochemical cell comprises, a gel anode film, a gel cathode film, and a gel electrolyte film, where, further, at least a portion of the gel anode film contacts at least a portion of the gel electrolyte film, at least a portion of the gel cathode film contacts at least a portion of the gel electrolyte film, each of the multiple electrochemical cells, the gel anode films, the gel cathode films, and the gel electrolyte films may be non-toxic for an application to an animal, and further, in which the gel anode film of a first electrochemical cell is in electrical communication with the gel cathode film of a second electrochemical cell.

In an embodiment, a method of fabricating an electrochemical cell comprises providing at least one gel anode film, providing at least one gel cathode film, contacting at least a portion of a gel electrolyte film with at least a portion of the gel anode film, and contacting at least a portion of the gel electrolyte film with at least a portion of the gel cathode film, in which the electrochemical cell, the gel anode film, the gel cathode film, and the gel electrolyte film may be non-toxic for an application to an animal.

In an embodiment, a method of fabricating a electrochemical cell comprises fabricating at least one wet gel anode film, drying the wet gel anode film to form a gel anode film, fabricating at least one wet gel electrolyte film, in which at least a portion of the wet gel electrolyte film contacts at least a portion of the gel anode film, drying the wet gel electrolyte film to form a gel electrolyte film, fabricating at least one wet gel cathode film, in which at least a portion of the wet gel cathode film contacts at least a portion of the gel electrolyte film, and drying the wet cathode layer, to form a gel cathode layer, in which the electrochemical cell, the gel anode film, the gel cathode film, and the gel electrolyte film may be non-toxic for an application to an animal.

In an embodiment, a consumable product comprises an electrochemical device and a carrier medium in contact with the electrochemical device, in which both the electrochemical device and the carrier medium may be non-toxic for consumption by an animal.

DETAILED DESCRIPTION

Described herein are illustrative methods and apparatuses relating to a gel battery that is configured to deliver an electrical current. Non-limiting uses of the battery may include incorporation of the battery into an edible product, using the battery topically on humans, animals, plants, etc., to treat a condition, stimulate a muscle, reduce sweat, provide sexual pleasure, etc., using the battery to increase saliva production, using the battery to treat dry mouth or canker sores, using the battery as a breath freshener, using the battery as an antiseptic, using the battery to help deliver a vitamin or drug, using the battery to enhance a cleaning agent, using the battery as a lotion, etc. In one illustrative embodiment, components of the battery can include gel anodes, gel cathodes, and gel electrolytes. The components may be composed of food grade materials that are safe for human consumption. Non-limiting examples of food-grade anodes include copper, carbon, manganese dioxide, and iron. The food-grade cathode may be, but is not limited to, zinc or nickel. Non-limiting examples of a food-grade electrolyte include phosphoric acid, ascorbic acid, and salt. A gel battery can be activated by connecting the gel anode and the gel cathode in the presence of a gel electrolyte. In one embodiment, the gel electrolyte may be incorporated into one or both of the gel anode and the gel cathode. Upon activation, an electrical current can produce a noticeable sensation. For example, an edible gel battery can generate a current that may be felt, for example, in a mouth, gums, lips, stomach, etc.

The voltage of an illustrative battery may be increased or decreased in various ways. One such example is by using multiple batteries combined in series. For example, a second gel battery may be configured to be in series with a first gel battery. One or more additional batteries may similarly be connected in series with the first and second batteries to generate additional electrical voltage. Alternatively, multiple batteries can be combined in parallel with one another to increase current in a circuit.

Figure 1:
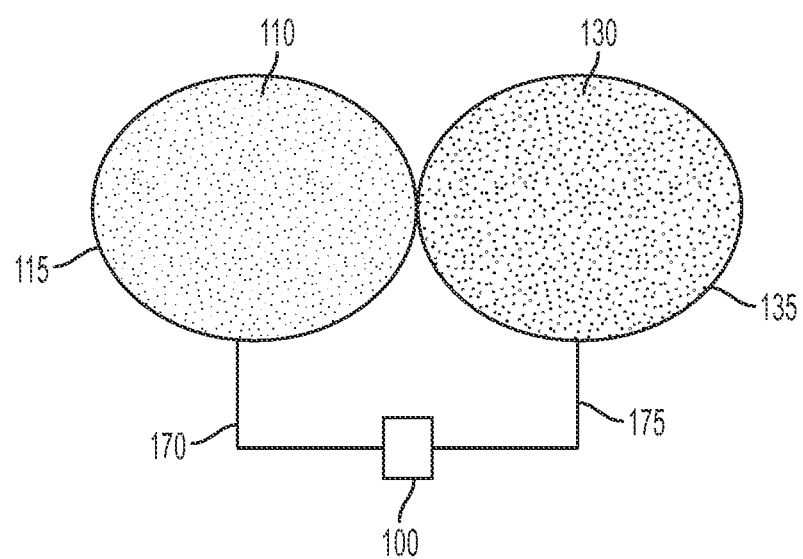
FIG. 1 illustrates an embodiment of a cathode chamber and an anode chamber in accordance with the present disclosure.

It will be understood that the above embodiments and configurations are given as illustrative examples only and that other configurations of the battery will be apparent to those of skill in the art in light of the present disclosure. Additional details and embodiments are described with reference to the figures. FIG. 1 illustrates a cathode chamber 135 and an anode chamber 115 for forming a gel battery 100 in accordance with an illustrative embodiment. In one embodiment, the anode chamber 115 and the cathode chamber 135 can be incorporated into a dispenser for dispensing products such as, but not limited to, deodorants, toothpaste, shampoo, liquid soap, lotions, cleaners, etc. In other embodiments, the chambers 115 and 135 can be incorporated into a pill or into food products such as, but not limited to, gum, a jelly bean, candy, etc.

The cathode chamber 135 can store a gel cathode 130. Likewise, the anode chamber 115 can store a gel anode 110. The gel cathode 130 and/or the gel anode 110 can be made of various types of gels such as, but not limited to, aquagel, colloidal gel, hydrogel, etc. In one embodiment, the gel cathode 130 can be made by adding a cathode such as, but not limited to, zinc or nickel, to a gel. Similarly, a gel anode can be made by adding to a gel an anode such as, but not limited to, copper, carbon, manganese dioxide, or iron. The anode or cathode can be incorporated in the gel by stirring or using a homogenizer. In one embodiment, the volume concentration of the anode and cathode is about 0.25. Other concentrations can also be used such as, but not limited to, 0.1, 0.5, 0.75, etc. In some embodiments, the gel can be heated prior to the adding of the anode or cathode. In an illustrative embodiment, the anode chamber 115 and the cathode chamber 135 are made of a non-conductive material such as, but not limited to, e.g., a plastic, glass, wood, etc. When the gel anode 110 and the gel cathode 130 come into contact with one another and a gel electrolyte, the gel battery 100 is formed. Paths 170 and 175 illustrate physical paths that may be traversed by a portion of the gel anode 110 and a portion of the gel cathode 130, respectively, to create the gel battery 100. As discussed in further detail below, the paths 170 and 175 may be implemented as an anode dispensing channel mounted to the anode chamber 115 and a cathode dispensing channel mounted to the cathode chamber 135, respectively. In an illustrative embodiment, the gel electrolyte may be integrated into at least one of the gel anode 110 or the gel cathode 130 such that the gel battery can be formed.

As discussed in further detail below, a gel battery may be incorporated into or may form various types of food products, such as, but not limited to, snack foods, prepared foods, candies, and condiments. Specific examples of food products that the gel battery 100 may form include, but are not limited to, gel candy, a preserve, spreadable cheese, etc. Various food-grade products can be used for the gel anode 110, the gel cathode 130, and the gel electrolyte. For example, food-grade products that may make up the gel anode 110 include, but are not limited to, copper, carbon, manganese dioxide, or iron. The gel cathode 130 may be made of, but is not limited to, zinc or nickel. The gel electrolyte may be made of, but not limited to, phosphoric acid, ascorbic acid, and salt.

In one embodiment, the gel anode 110 and gel cathode 130 may be made of food-grade products such as vitamins and/or minerals. In some embodiments, the gel anode 110 and/or the gel cathode 130 can include an electrolyte. In another embodiment, a gel electrolyte can connect the gel anode 110 and the gel cathode 130. Upon ingestion of the gel battery by a subject, the vitamins and/or minerals can be delivered to the subject. The gel anode 110, the gel electrolyte and/or the gel cathode 130 may also be incorporated into a pill such as, but not limited to, a vitamin, a mineral, or a drug. In one such embodiment, the cathode chamber 135 and the anode chamber 115 may be formed by the pill or a digestible substance inserted into the pill and an electrolyte can be included in the gel anode 110 and/or the gel cathode 130.

Figure 2:
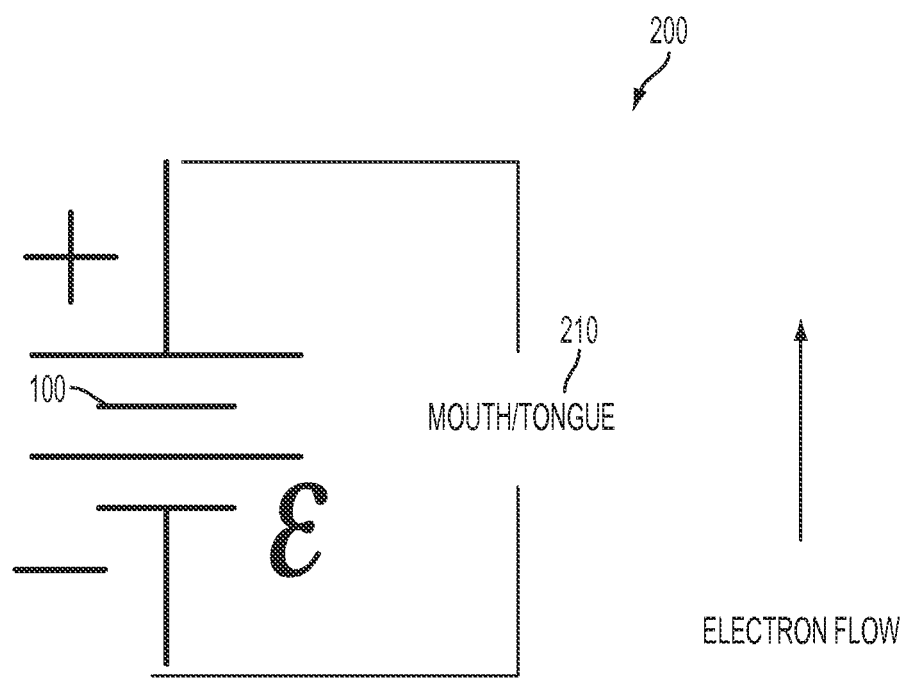
FIG. 2 illustrates an embodiment of an electrical circuit formed in a mouth with the gel battery in accordance with the present disclosure.

FIG. 2 illustrates an electrical circuit 200 that includes a gel battery 100 and a mouth 210 in which the gel battery 100 is activated in accordance with an illustrative embodiment. For example, a tongue in the mouth 210 of a subject may connect the gel anode 110 and gel cathode 130 to form the circuit 200. The circuit 200, however, is not limited to being formed by a tongue. Rather, the circuit 200 may be formed with one or more other parts of the mouth, including, but not limited to, teeth, gums, the walls of the mouth, and/or any fluid that is associated with the mouth 210. Additionally, the circuit 200 is not limited to being formed in the mouth and can be formed on, but not limited to, skin or a scalp. Any conductive surface, such as, but not limited to, a counter top, a floor, a wall, etc. can also be used to connect the gel anode 110 and the gel cathode 130 to create the circuit 200. Once the circuit 200 is formed, the gel battery 100 generates a direct current that flows through the circuit 200. In an illustrative embodiment, the current is detectable by a user as a tingling of the parts of the mouth 210 or other body part that forms the circuit 200.

Figure 3:
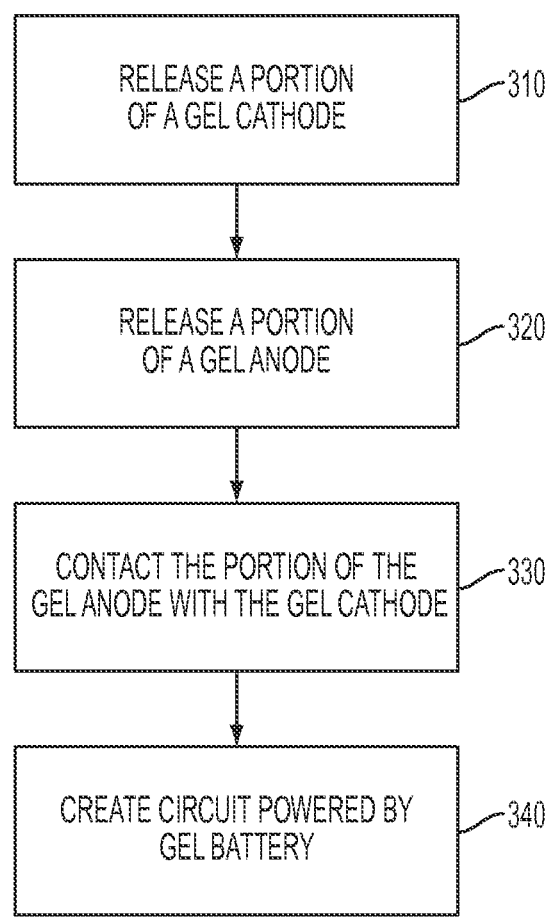
FIG. 3 is a flow diagram of an embodiment of operations performed in forming a gel battery in accordance with the present disclosure.
Figure 4:
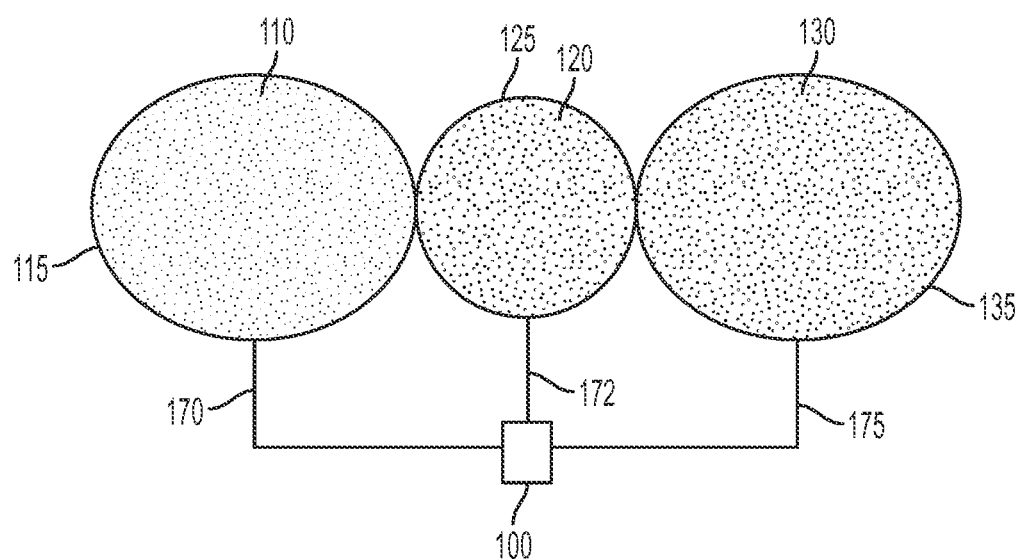
FIG. 4 illustrates an embodiment of a cathode chamber, an electrolyte chamber, and an anode chamber in accordance with the present disclosure.

FIG. 3 is a flow diagram that depicts operations performed in creating a gel battery 100. Additional, fewer, and/or different operations may be performed depending on the particular implementation. In addition, one or more of the operations may be performed in a different order depending on the particular implementation. In an operation 310, a portion of the gel cathode 130, stored in a cathode chamber 135, is released. In an operation 320, a portion of the gel anode 110, stored in an anode chamber 115, is released. In an embodiment in which the cathode chamber 135 and the anode chamber 115 are part of a dispenser, the gel cathode 130 and the gel anode 115 may be released simultaneously as a user pushes a button (or other actuator) to activate the dispenser. The portion of the gel cathode 130 contacts the portion of the gel anode 110 to form a gel battery 100 that can generate an electrical current in an operation 330. In some embodiments, the gel anode 110 and/or the gel cathode 130 can include an electrolyte. In another embodiment, a gel electrolyte 120 is stored in a gel electrolyte chamber 125 (as shown in FIG. 4). In this embodiment, a portion of the gel electrolyte 120 can be released to connect the gel anode 110 and the gel cathode 130 to form a gel battery 100. In an operation 340, a circuit, such as, but not limited to, circuit 200 (of FIG. 2), is formed and electrical current flows through the circuit 200 powered by the gel battery 100.

FIG. 4 illustrates a cathode chamber 115, an electrolyte chamber 125, and an anode chamber 135 for forming the gel battery 100 in accordance with an illustrative embodiment. In one embodiment, the anode chamber 115, the electrolyte chamber 125, and the cathode chamber 135 can be incorporated into a dispenser for dispensing products such as, but not limited to, liquid soaps, deodorants, toothpastes, lotions, shampoos, cleaners, etc. In other embodiments, the chambers 115, 125, and 135 can be incorporated into a pill or into food products such as, but not limited to, gum, a jelly bean, candy, etc. The electrolyte chamber 125 can store a gel electrolyte 120. The gel anode 110 and/or the gel cathode 130 can also include an electrolyte, which may be different or the same as the electrolyte within the gel electrolyte 120. The gel electrolyte 120 can be made of various types of gels such as, but not limited to, aquagel, colloidal gel, hydrogel, etc. In one embodiment, the gel electrolyte 120 can be made by adding an electrolyte such as, but not limited to, phosphoric acid, ascorbic acid, citric acid, or salt, to a gel. The electrolyte can be incorporated in the gel by stirring or using a homogenizer. In one embodiment, the volume concentration of the electrolyte is about 0.25. Other concentrations can also be used such as, but not limited to, 0.1, 0.5, 0.75, etc. In some embodiments, the gel can be heated prior to the adding of the electrolyte. An electrolyte can be added to the gel anode 110 and/or the gel cathode 130. In one embodiment, citric acid can be used as an electrolyte and can be added to the gel anode 110 and/or the gel cathode 130 in volume concentrations of, but not limited to, 0.01, 0.05, 0.1, 0.015, 0.25, etc.

In an alternative embodiment, the electrolyte chamber 125 can be a separator chamber that includes a separator such as, but not limited to, potato, starch, etc. The separator can be dispensed in between the gel anode 110 and the gel cathode 130 to separate the gel anode 110 from the gel cathode 130. In this embodiment, the gel anode 110 and/or the gel cathode 130 can include the gel electrolyte 120. In an illustrative embodiment, the separator can be porous to allow the flow of ions between the gel anode 110 and the gel cathode 130. In another embodiment, an electrolyte or the gel electrolyte 120 can be incorporated into the separator.

Path 172 illustrates a physical path that may be traversed by a portion of the gel electrolyte 120 such that the gel battery 100 can be formed. As discussed in further detail below, the path 172 may be implemented as an electrolyte dispensing channel mounted to the electrolyte chamber 125. In an illustrative embodiment, the gel battery 100 can be formed when at least a portion of the gel anode 110 comes into contact with at least a portion of the gel cathode 130, and when the gel electrolyte 120 comes into contact with at least the portion of the gel cathode 130 and/or at least the portion of the gel anode 110. As discussed in further detail below, the gel anode 110, the gel electrolyte 120, and gel cathode 130 can come into contact after being dispensed through an anode dispensing channel, an electrolyte dispensing channel, and a cathode dispensing channel, respectively.

Figure 5A:
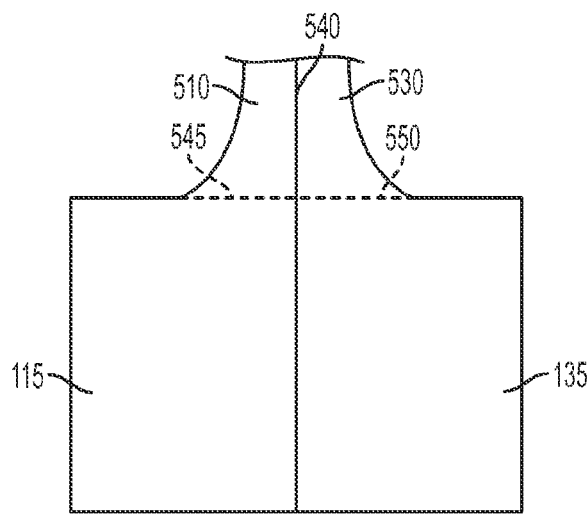
FIG. 5A illustrates an embodiment of a cathode chamber and an anode chamber in accordance with the present disclosure.
Figure 5B:
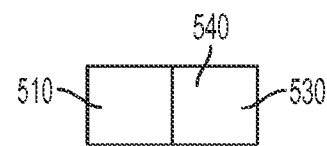
FIG. 5B illustrates a front plan view of an embodiment of an anode dispensing channel and a cathode dispensing channel in accordance with the present disclosure.

FIG. 5A illustrates a cathode chamber 135 and an anode chamber 115 in accordance with an illustrative embodiment. In one embodiment, the anode chamber 115 and the cathode chamber 135 can be incorporated into a dispenser for dispensing products such as, but not limited to, deodorants, toothpastes, shampoos, liquid soaps, lotions, cleaners, antibacterial compositions, antiviral compositions, etc. In other embodiments, the chambers 115 and 135 can be incorporated into a pill or into food products such as, but not limited to, gum, a jelly bean, candy, etc. In these embodiments, the gel anode and/or the gel cathode can include an electrolyte. The anode chamber 115 and the cathode chamber 135 store a gel anode and gel cathode, respectively. The gel anode exits the anode chamber 115 through an anode dispensing channel 510. The gel cathode exits the cathode chamber 135 through a cathode dispensing channel 530. FIG. 5B illustrates a front plan view of the anode dispensing channel 510 and the cathode dispensing channel 530. The anode dispensing channel 510 is separated from the cathode dispensing chamber by a separator 540. As the gel anode 110 and gel cathode 130 exit their respective dispensing channels 510 and 530, the gel anode 110 and the gel cathode 130 come into contact with one another. A gel battery 100 is created when the gel anode and the gel cathode come into contact with one another.

An anode valve 545 can separate the anode chamber 115 from the anode dispensing channel 510. A cathode valve 550 can separate the cathode chamber 135 from the cathode dispensing channel 530. An actuator or button can cause the valves 545 and 550 to open or move such that the chambers 115 and 135 are placed in fluid communication with their respective channels 510 and 520. Open valves 545 and 550 can allow the gel anode and the gel cathode to be released from the chambers 115 and 135 into the chambers 510 and 530, respectively. In one embodiment, the gel anode contacts the gel cathode once dispensed from a dispenser. In this embodiment, the gel battery 100 is formed external to the dispenser.

In another embodiment, a combination channel is connected to the anode dispensing chamber 115 and the cathode dispensing chamber 135. The combination channel can allow the gel anode and the gel cathode to come into contact with one another prior to exiting the combination channel into an external environment. In these embodiments, the gel anode and/or the gel cathode can include an electrolyte.

Figures 6A, 6B:
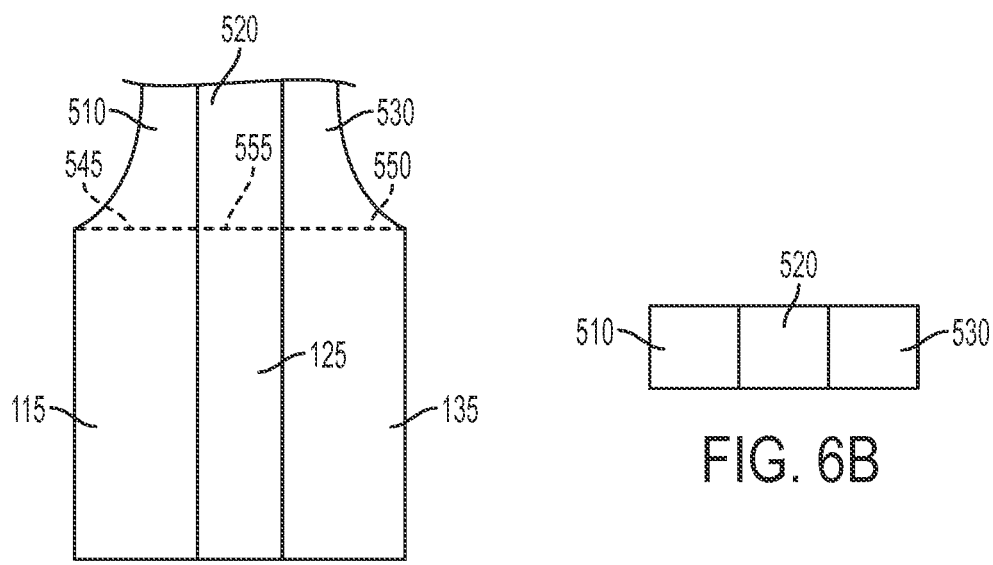
FIG. 6A illustrates an embodiment of a cathode chamber, an electrolyte chamber, and an anode chamber in accordance with the present disclosure.
FIG. 6B illustrates a front plan view of an embodiment of an anode dispensing channel, an electrolyte dispensing channel, and a cathode dispensing channel in accordance with the present disclosure.

FIG. 6A illustrates a cathode chamber 135, an electrolyte chamber 125, and an anode chamber 115 in accordance with an illustrative embodiment. The anode chamber 115 and the cathode chamber 135 store a gel anode and gel cathode, respectively. The electrolyte chamber 125 stores a gel electrolyte 120. The gel anode exits the anode chamber 115 through an anode dispensing channel 510. The gel electrolyte exits the electrolyte chamber 125 through an electrolyte dispensing chamber 520, and the gel cathode exits the cathode chamber 135 through a cathode dispensing channel 530. FIG. 6B illustrates a frontal plan view of the anode dispensing channel 510, electrolyte dispensing channel 520, and the cathode dispensing channel 530. As the gel anode, gel electrolyte, and gel cathode exit their respective dispensing channels 510, 520, and 530, the gel electrolyte comes into contact with both the gel anode and the gel cathode. A gel battery 100 is formed when the gel electrolyte comes into contact with the gel anode and the gel cathode.

An electrolyte valve 555 can separate the electrolyte chamber 125 from the electrolyte dispensing channel 520. An actuator or button can cause the valves 545, 555, and 550 to open or move such that the chambers 115, 125, and 135 are placed in fluid communication with their respective channels 510, 520, and 520. The gel electrolyte 120 can released from chamber 125 when valve 555 is open.

Figure 7:
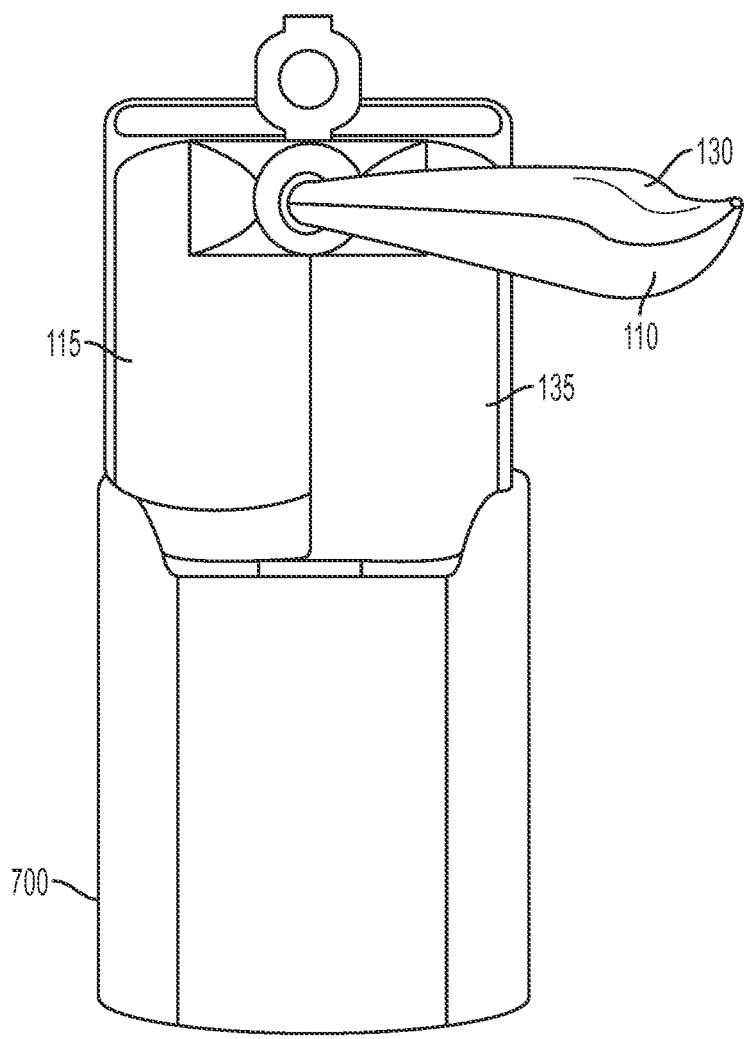
FIG. 7 illustrates an embodiment of a housing for a gel anode and a gel cathode in accordance with the present disclosure.

FIG. 7 illustrates a gel battery dispenser 700 for forming a gel battery in accordance with an illustrative embodiment. The gel battery dispenser 700 includes the anode chamber 115 and the cathode chamber 135. FIG. 7 illustrates the dispensed gel cathode 130 being horizontally aligned with the dispensed gel anode 110. Any alignment, however, can be used, such as a vertical alignment. The gel battery dispenser 700 can include an actuator that when actuated causes a portion of the gel anode 110 to enter the anode dispensing chamber 510 and a portion of the gel cathode 130 to enter the cathode dispensing chamber 530. In one embodiment, a movable bottom of the dispenser or the anode chamber 115 and the cathode chamber 135 can cause the gel anode 110 and/or the gel cathode 130 to be dispensed. In another embodiment, the gel battery dispenser 700 also includes the electrolyte chamber 120, and the actuator allows a portion of the gel electrolyte 120 to enter the electrolyte dispensing chamber 520. In another embodiment, the gel battery dispenser 700 does not include an actuator, but instead the gel battery dispenser 700 can be a collapsible tube. Pressure applied to the gel battery dispenser 700 can cause an amount of the gel anode 110, gel cathode 130, and/or gel electrolyte 120 to exit the gel battery dispenser 700 and thereby form a gel battery 100. In another illustrative embodiment, the gel battery dispenser 700 can be disposable. For example, the gel battery dispenser 700 can be used to store a limited amount of the gel anode 110 and gel cathode 130, which in turn, can be used to create a limited number of gel batteries 100. The gel battery dispenser 700 can be opened, such as by tearing open a portion of the gel battery dispenser 700, and pressure applied to the gel battery dispenser 700 can be used to create the gel batteries 100.

In another embodiment, a pill can be used to store the gel anode 110, the gel cathode 130, and/or the gel electrolyte 120. The pill can include an anode chamber that is separated from a cathode chamber. A coating can surround the pill and encapsulate the anode chamber and the cathode chamber. The coating can be made of, but not limited to, e.g., gelatin, wax, hypromellose, methyl cellulose, hydroxypropyl cellulose, etc. In one embodiment, the pill can be swallowed by a subject and the coating can dissolve during digestion. Eventually, the gel anode and the gel cathode can be released from the pill and come into contact with one another to create a gel battery 100. In another embodiment, the pill can be chewed, which can release the gel anode 110 and the gel cathode 130. In some embodiments, an electrolyte can be included with the gel anode and/or the gel cathode. In other embodiments, the pill can include a separate electrolyte chamber. In another embodiment, the pill can also include a drug or vitamin, whose delivery is affected by the current generated by the gel formed battery 100. In another embodiment, one or more pills can be integrated into a component, such as, but not limited to, a preserve, a cheese product, a shampoo, or a cleaning agent. Pressure applied to the component, such as through spreading the component or massaging the component, can cause the coating to rupture and allow a portion of the gel anode can come into contact with a portion of the gel cathode to create a gel battery 100. In some embodiments, the gel anode and/or the gel cathode can include an electrolyte. In other embodiments, the pills can include an electrolyte chamber for storing a gel electrolyte. In yet another embodiment, a pill can contain only a portion of gel battery 100, such as the gel anode 110, the gel cathode 130, or the gel electrolyte 120. As the various pills rupture, components from different pills can be combined to form gel batteries. In one embodiment, spherical pills can be formed using sodium alginate fixed in a calcium chloride bath that can contain the gel anode 110, the gel electrolyte 120, or the gel cathode 130.

The current created by a gel battery 100 can be used in numerous ways. In one example, the current of a gel battery 100 can be used to effect delivery/absorption of a drug, to combat bacteria such as the bacteria that causes acne, to combat a virus such as the herpes virus, to stimulate muscles, etc. In addition, the current can also have an anti-bacterial effect and/or an anti-viral effect. In another embodiment, the gel anode 110, the gel electrolyte 120, or the gel cathode 130 can include an antibacterial agent. In an illustrative embodiment, the gel battery 100 can be a facial mask. The current from the gel battery 100 of the facial mask can be used as an acne treatment. The current from a gel battery 100 can also have an anti-viral effect and can be used in the treatment of skin sores or sores of the mouth, such as, but not limited to, canker sores. In another embodiment, the current from a gel battery 100 can be used to treat various skin conditions. In one illustrative embodiment, a gel battery 100 can be applied to a rash, an area of dry skin, and/or an area of irritated skin. The gel battery 100 can generate a current that flows through portions of the skin, which can be used to diminish itching in skin by providing a competing stimulus.

In another embodiment, the gel anode 110 and the gel cathode 130 can be made of cosmetic grade materials, such as, but not limited to, aluminum and carbon. In some embodiments, the gel electrolyte 120 can also be made of cosmetic grade materials. One or more gel batteries 100, using cosmetic grade materials, can be used as an antiperspirant and/or deodorant. For example, the gel anode 110 can include an aluminum complex and the gel cathode 130 can include carbon. In another embodiment, the gel battery 100 can include a cosmetic grade gel electrolyte 120 that contains salt. Illustrative aluminum complexes include, but are not limited to, aluminum chloride, aluminum chlorohydrate, and aluminum-zirconium compounds. The current produced by the gel battery 100 through a subject's skin can aid in the iontophoretic delivery of the aluminum-based complexes. Although not intending to be limited by theory, the aluminum-based complexes may aid in the formation of plugs in sweat glands, and thus, can help prevent perspiration. The aluminum-based complexes may also interact with keratin fibrils in sweat ducts and form a physical plug that prevents sweat from reaching the surface of skin. Accordingly, a gel battery 100 can be used to combat excessive sweating in an area of skin that is covered by the gel battery 100. One or more of the gel anode 110, the gel electrolyte 120, and the gel cathode 130 can also include fragrant materials.

In another illustrative embodiment, a gel battery 100 can be used to treat wounds or burns. The gel battery 100 can be applied to an affected portion of a subject's skin to provide a current through the subject's skin tissue. The current can be used to affect the healing of the wound through, but not limited to, increasing blood flow, enhancing tissue oxygenation, preventing an infection, stimulating epidermal cell reproduction, etc. In some embodiments, the electrical current can reduce the amount of scar tissue of a healed wound, resulting in a smoother and thinner scar.

In another illustrative embodiment, a gel battery 100 can include other components such that the gel battery 100 can be used as a mouthwash, as toothpaste, as shampoo, as an enhancement to hair dye, as a facial mask, as a teeth whitener, to deliver medicine such as, but not limited to, antacid medicine, cold medicine, nicotine, or anti-gas medicine, as an energy supplement, or for sexual stimulation. In each of these embodiments, a gel battery 100 can provide an electrical current that enhances the performance of the component for its intended purpose. For instance, the electrical current may facilitate the delivery of a drug contained within the gel anode 110, gel electrolyte 120, or gel cathode 130, or a drug that is taken simultaneously with the gel battery 100. In another embodiment, the current from the gel battery 100 may impede the flora of the mouth, and therefore, helps protect against cavities and/or gum disease. In addition, the gel battery 100 may also increase the production and secretion of saliva, which also helps protect against cavities and/or gum disease. In another embodiment, the gel battery 100 is a toothpaste that can include flavoring, such as, but not limited to, mint, bubble gum, berry, etc.

Another illustrative embodiment includes a gel battery 100 that includes a hair dye. As the hair dye is applied, the gel battery 100 can create an electrical current that flows through a person's scalp and hair. This electrical current can enhance the application of the hair dye, for example by reducing the application time and/or by increasing the absorption of the hair dye into hair. In another illustrative embodiment, a gel battery 100 includes a cleaner. Current from the gel battery 100 can help loosen dirt, grease, and/or enhance the cleaning ability of the cleaner.

The gel battery 100 can also be used for sexual stimulation. In an illustrative embodiment, one or more gel batteries 100 can be placed upon or within sex organs. The gel battery 100 can produce an electrical current that flows through a subject's genitals to provide sexual stimulation. In another embodiment, the gel anode 110 can be placed one subject's body and the gel cathode 130 can be placed on a second subject's body. When the gel anode 110 and the gel cathode 130 come into contact a gel battery 100 is created, and an electrical current will flow between the subjects. In these embodiments, the gel anode 110 and/or the gel cathode 130 can include an electrolyte. In addition, the effects of the gel battery 100 are transferable from one person to another. For instance, portions of a gel battery 100 can be transferred between two individuals through kissing, fellatio, cunnilingus, sexual intercourse, etc. The electrical current can result in heightened sexual stimulation.

A number of parameters may influence the properties of the gel battery 100. For example, the terminal voltage of the gel battery 100, the amperage of the circuit 200 (FIG. 2), and the lifespan of the gel battery 100 may be configured based upon the properties of the gel battery 100. The materials that make up the gel anode 110 and gel cathode 130 provide properties that affect the voltage of the gel battery 100. In one embodiment, the amperage of the circuit 200 can be increased by increasing the molar concentration of the electrolyte in the gel cathode 130 and/or gel anode 110. Increasing the surface area between the gel anode 110, gel cathode 130, and/or the gel electrolyte 120 can also increase the amperage of the circuit 200. In one embodiment, the surface area is increased based upon the shapes of the gel anode 110 and the gel cathode 130 prior to coming into contact with one another. The shapes can be formed based on the shape of the apertures through which the gel anode 110 and gel cathode 130 are dispensed (or extruded). The placement of the apertures relative to one another can also be used to increase amount of surface area of the connection between the gel anode 110 and the gel cathode 130.

In one embodiment, the gel anode 110 can be, but is not limited to, a hexagon, a pentagon, a triangle, etc. Any corresponding shape that increases the surface area of the connection of the gel anode 110 and gel cathode 130 can be used. The gel cathode 130 can be a shape that comes into contact with multiple sides of the gel anode 110. As an example, the gel anode 110 may be dispensed in the shape of a triangle and the gel cathode 130 may be dispensed in a "V" shape that corresponds to an apex and two sides of the triangle. The aperture that dispenses the gel cathode 130 can be positioned relative to the aperture that dispenses the gel anode 110 such that the "V" shaped gel cathode 130 comes into contact with two sides of the triangular shaped gel anode 110. Alternatively, the gel cathode 130 can be shaped as, but not limited to, a hexagon, a triangle, a pentagon, a rectangle, an octagon, etc, and the aperture that dispenses the gel anode 110 can be shaped and positioned such that the gel anode 110 comes into contact with multiple sides of the gel cathode 130. For example, an aperture that dispenses the gel cathode 130 can be a hexagon, and an aperture that dispenses the gel anode 110 can be shaped and positioned such that gel anode 110 comes into contact with two, three, four, etc. sides of the hexagonally shaped gel cathode 130.

The size of the gel battery 100 is another property that may be used to configure the gel battery 100. Specifically, the size of the gel battery 100 may be used to configure how long the gel battery 100 is operable. Generally, the more gel anode 110 and gel cathode 130 used to create the gel battery 100 the longer the battery will remain active. The concentration of the anode, cathode, and electrolyte also impacts the longevity of the gel battery 100. For example, higher concentrations of the anode, cathode, and electrolyte within a gel results in a longer lasting gel battery 100. A gel battery 100 may remain active between 5 and 60 seconds. In alternative embodiments, the gel battery 100 can be configured to remain active for less than 5 seconds or greater than 60 seconds. The time the gel battery 100 is active may be increased by using a greater amount and/or concentration of gel anodes 110 and gel cathodes 130. The amount and/or concentration of the gel electrolyte 120 or the concentration of an electrolyte in the gel anode 110 and/or gel cathode 130 also impacts the activation length of the gel battery 100. Larger amounts or larger concentrations of the gel electrolyte 120 and higher concentrations of an electrolyte in the gel anode 110 and/or the gel cathode 130 can increase the time the gel battery 100 remains active.

Figure 8:
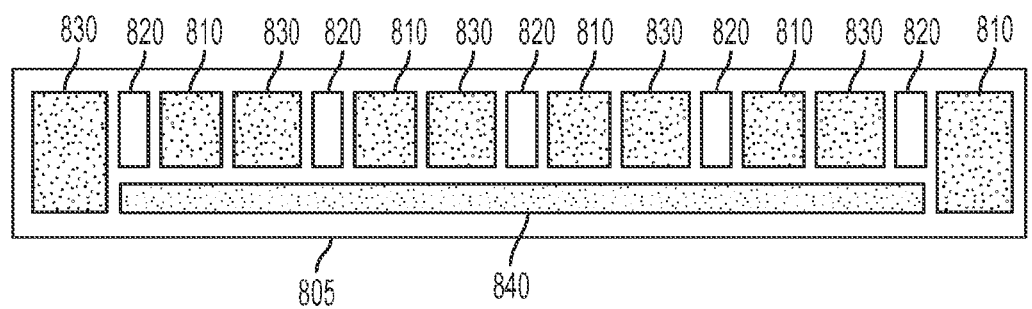
FIG. 8 illustrates an embodiment of multiple gel batteries in series in accordance with the present disclosure.

The terminal voltage of the battery 100, the current of the circuit 200, and lifespan of the battery 100 may be also be controlled by using multiple batteries. FIG. 8 illustrates multiple gel batteries in series in accordance with an illustrative embodiment. A manifold dispensing nozzle 805 can be used to create multiple gel batteries in series with one another. In one embodiment, the manifold dispensing nozzle can be created using three dimensional printing. An anode manifold can be connected to the anode storage chamber 115. The anode manifold can dispense any number of portions 810 of the gel anode 110. A cathode manifold can connect to the cathode chamber 135 and dispense a number of portions 830 of the gel cathode 130. Similarly in another embodiment, an electrolyte manifold can connect to electrolyte chamber 125 and dispense numerous portions 820 of the gel electrolyte 120. The portions 810 of the gel anode 110 and the portions 830 of the gel cathode 130 can be interleaved with one another to create a number of gel batteries that are in series with one another. In another embodiment, the multiple gel batteries can be connected in parallel with one another. For ease of illustration, the various illustrated portions 810, 820, and 830 have space between them. These portions, however, can be connected to form the multiple gel batteries in series with one another. A payload 840 can be included along with the batteries. The payload can be, but is not limited to, a food, a lotion, a toothpaste, a cleaner, a shampoo, a hair dye, a facial mask, a medicine, a pharmaceutical composition, or a teeth whitener.

Numerous embodiments of the gel battery 100 can be incorporated into various foods. In addition to producing a current, a gel battery 100 can increase the amount of saliva generated in the mouth of a user. Saliva can be produced by the stimulation of either or both the sympathetic nervous system and the parasympathetic nervous system. For example, stimulation of the trigeminal nerve can result in an increase in the secretion and production of saliva. While not intending to be limited by theory, a gel battery 100 may stimulate the trigeminal nerve and/or other nerves of the sympathetic and parasympathetic nervous systems. Accordingly, a gel battery 100 can result in an increase in both saliva production and saliva secretion. In an illustrative embodiment, a gel battery can be a gel mouth rinse or toothpaste. The gel battery 100 can increase the saliva production and saliva secretion of the user by stimulating the sympathetic nervous system and/or parasympathetic nervous system. Accordingly, a gel battery 100 can be used to treat such conditions as Xerostomia (e.g., dry mouth) by increasing saliva production and secretion. The current generated by the gel battery 100 can enhance the absorption of a drug contained within the gel anode 110, gel electrolyte 120, and/or gel cathode 130 through stimulation of tissues in the mouth, stomach, and/or small intestines.

Figure 9:
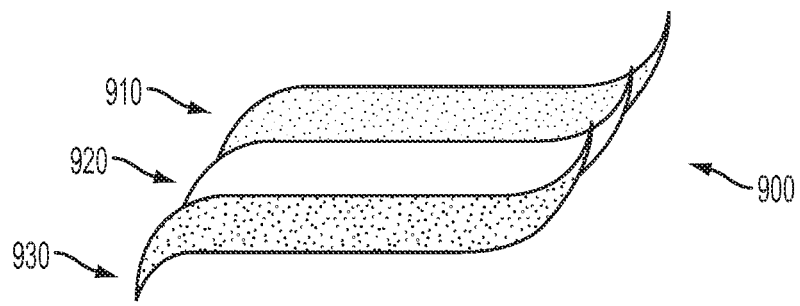
FIG. 9 illustrates an embodiment of a gel battery in accordance with the present disclosure.

FIG. 9 illustrates one embodiment of an electrochemical cell comprising gel materials 900. In one embodiment, the cell comprises a gel anode 910, a gel cathode 930, and a gel electrolyte 920. As illustrated in FIG. 9, the gel anode 910 and gel cathode 930 are at least in partial contact with the gel electrolyte 920. Thus, portions of the gel anode might not be in contact with the electrolyte, and portions of the gel cathode also might not be in contact with the electrolyte. Additionally, portions of the electrolyte might not be in contact with either one of the cathode or anode. The materials comprising the electrochemical cell 900, including the gel anode 910, gel cathode 930, and gel electrolyte 920, can be compositions that may be non-toxic to an animal to which the electrode is applied. While it is understood that such an electrochemical cell may be applied to any animal, disclosures of the use of the electrochemical cell below may, for illustrative purposes only, refer to the use by humans.

In one embodiment, the gel anode 910 may comprise an anode compound, including, without limitation, any one or more of, finely divided powders of zinc metal, aluminum metal, and magnesium metal. The gel anode may also comprise a gelling compound, such as a food-grade polymer. Examples of such food-grade polymers may include without limitation an alginate, a carrageenan, a pectin, gellan gum, and a dextrin. The gel anode may also comprise other components, including, without limitation, odorants, colorants, flavorants, stabilizers, fillers, binders, and preservatives. Some examples may include lemon oil, menthol, sweet almond oil, and food colorings. The anode material in the gel anode may be present at an amount of about 0.5% by weight to the gel material to about 6% by weight to the gel material. In one embodiment, the amount of anode material may be about 1.5% by weight to the gel material. Examples of the amount of anode material that may be present includes 0.5%, 1%, 1.5%, 2%, 2.5%, 3%, 3.5%, 4%, 4.5%, 5%, 5.5% and 6% by weight and ranges between any two of these values.

In one embodiment, the gel cathode 930 may comprise a cathode compound, including, without limitation, copper gluconate or other cupric salt. The gel cathode may also comprise a gelling compound, such as a food-grade polymer. Examples of such food-grade polymers may include without limitation an alginate, a carrageenan, a pectin, gellan gum, and a dextrin. The gel cathode may also comprise other components, including, without limitation, odorants, colorants, flavorants, stabilizers, fillers, binders, and preservatives. Some examples may include lemon oil, menthol, sweet almond oil, and food colorings. The cathode material in the gel cathode may be present at an amount of about 0.5% by weight to the gel material to about 6% by weight to the gel material. In one embodiment, the amount of cathode material may be about 1.5% by weight to the gel material. Examples of the amount of cathode material that may be present includes 0.5%, 1%, 1.5%, 2%, 2.5%, 3%, 3.5%, 4%, 4.5%, 5%, 5.5% and 6% by weight and ranges between any two of these values.

In one embodiment, the gel electrolyte 920 may comprise an electrolyte compound, including, without limitation, any one or more of ascorbic acid, phosphoric acid, and a salt. The gel electrolyte may also comprise a gelling compound, such as a food-grade polymer. Examples of such food-grade polymers may include without limitation an alginate, a carrageenan, a pectin, gellan gum, and a dextrin. The gel electrolyte may also comprise other components, including, without limitation, odorants, colorants, flavorants, stabilizers, fillers, binders, and preservatives. Some examples may include lemon oil, menthol, sweet almond oil, and food colorings. The electrolyte material in the gel anode may be present at an amount about 0.5% by weight of the gel material to about 6% by weight of the gel material. In one embodiment, the amount of electrolyte material may be about 1.5% by weight of the gel material. Examples of the amount of electrolyte material that may be present includes 0.5%, 1%, 1.5%, 2%, 2.5%, 3%, 3.5%, 4%, 4.5%, 5%, 5.5%, 6% by weight and ranges between any two of these values.

Although FIG. 9 illustrates an embodiment in which three gel components form the electrochemical cell, in another embodiment, the electrolyte material may also be incorporated into the gel anode 910. In such an embodiment, a separate gel electrolyte, 920, may not be needed. In another embodiment, the electrolyte material may also be incorporated into the gel cathode 930. In such an embodiment, a separate gel electrolyte 920 may not be needed. In a further embodiment, the electrolyte material may be incorporated into a non-gel liquid that at least partially contacts both the gel anode 910 and the gel cathode 930. In this further embodiment, a separate gel electrolyte 920 may not be needed.

It may be appreciated that the electrochemical cell 900 may be configured to produce an electrical current when the cell is hydrated. Alternatively, the electrochemical cell may be configured to produce an electrical current when the gel components contact each other. Such contact may include, without limitation, being mixed together, being macerated, being wiped on or anointed on the animal, or if the material is spread on a surface or an animal. Other forms of contacting or combining the gel anode, gel cathode, and electrolyte may also be anticipated by this disclosure.

It may be understood that the voltage potential between the gel anode and the gel cathode may be determined, at least in part, on the anode material and the cathode material, together forming an electrochemical cell pair. For example, a Zinc/Copper pair may have a voltage of about 1.10 V, a Magnesium/Carbon pair may have a voltage of about 1.20 V, a Nickel/Iron pair may have a voltage of about 1.20 V, a Zinc/

Carbon pair may have a voltage of about 1.50 V, a Zinc/Manganese dioxide pair may have a voltage of about 1.50 V, and an Aluminum/Manganese dioxide pair may have a voltage of about 1.90 V.

Figure 10:
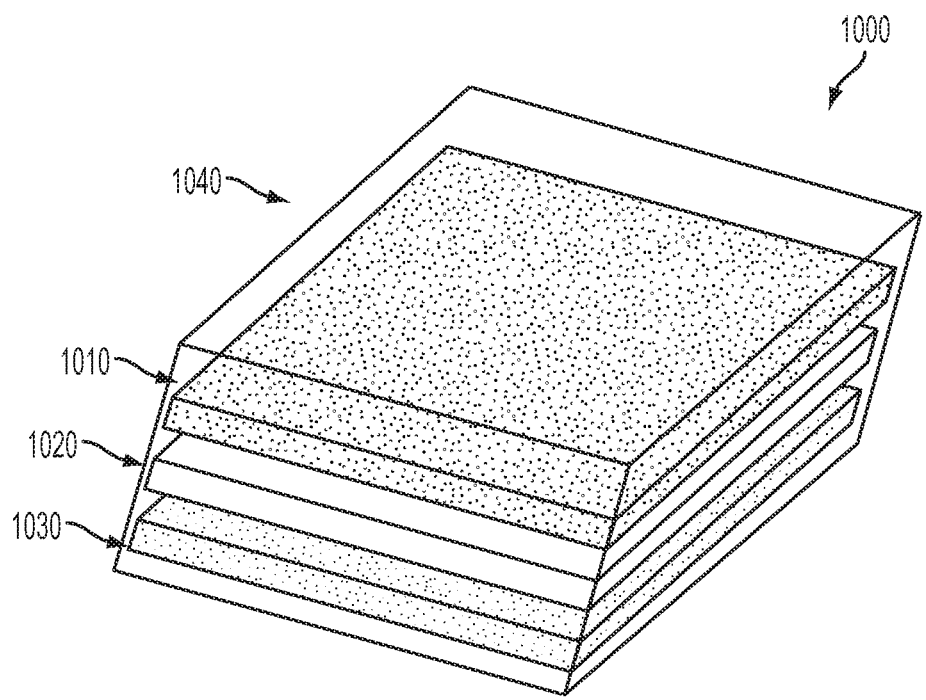
FIG. 10 illustrates another embodiment of a gel battery in accordance with the present disclosure.

FIG. 10 illustrates another embodiment of an electrochemical cell 1000. In this embodiment, the cell may comprise a gel anode film 1010, a gel cathode film 1030, and a gel electrolyte film 1020, in which at least a portion of the gel anode film may contact a portion of the electrolyte film, and at least a portion of the gel cathode film may contact the gel electrolyte film. In addition, the electrochemical cell may further comprise a coating 1040 that encloses the gel films. It may be understood that the electrochemical cell illustrated in FIG. 10, including its components and optional coating, may all be non-toxic for an application to or ingestion by an animal such as a human.

In one embodiment, the gel anode film 1010 may comprise an anode compound, including, without limitation, any one or more of finely divided zinc metal, aluminum metal, and magnesium metal. The gel anode film may also comprise a gelling compound, such as a food-grade polymer as disclosed above. The gel anode film may also comprise other components as disclosed above. The anode material in the gel anode film may be present in amounts as disclosed above with respect to the gel anode. The gel anode film may comprise dimensions of length, width, and thickness. The length of the gel anode film may be about 0.1 inch (0.25 cm) to about 10 inches (25 cm). In one embodiment, the length may be about 5.4 inches (about 13.7 cm.) In another embodiment, the length may be about 1 inch (2.5 cm). Examples of the length of the gel anode film may include 0.5 cm, 1 cm, 2 cm, 2.5 cm, 3 cm, 4 cm, 5 cm, 10 cm, 12 cm, 15 cm, 17 cm, 20 cm, 22 cm, 25 cm and ranges between any two of these values. The width of the gel anode film may be about 0.1 inch (0.25 cm) to about 10 inches (25 cm). In one embodiment, the width may be about 5.4 inches (about 13.7 cm.) In another embodiment, the width may be about 1 inch (2.5 cm). Examples of the width of the gel anode film may include 0.5 cm, 1 cm, 2 cm, 2.5 cm, 3 cm, 4 cm, 5 cm, 10 cm, 12 cm, 15 cm, 17 cm, 20 cm, 22 cm, 25 cm and ranges between any two of these values. The thickness of the gel anode film may be about 0.025 cm to about 0.062 cm. Examples of the thickness of the gel anode film may include about 0.020 cm, 0.025 cm, 0.03 cm, 0.035 cm, 0.04 cm, 0.045 cm, 0.05 cm, 0.055 cm, 0.06 cm, 0.065 cm and ranges between any two of these values.

In one embodiment, the gel cathode film 1030 may comprise a cathode compound, including, without limitation, copper gluconate. The gel cathode film may also comprise a gelling compound, as disclosed above. The gel cathode film may also comprise other components, including, without limitation, odorants, colorants, flavorants, stabilizers, fillers, binders, and preservatives, with examples as disclosed above. The cathode material in the gel cathode film may be present at an amount as disclosed above with respect to the gel cathode. The gel cathode film may comprise dimensions of length, width, and thickness. The length, width, and thickness of the gel cathode film may be substantially the same as the respective dimensions of the gel anode film, as disclosed above.

In one embodiment, the gel electrolyte film 920 may comprise an electrolyte compound, including, without limitation, any one or more of ascorbic acid, phosphoric acid, and a salt. The gel electrolyte film may also comprise a gelling compound, such as a food-grade polymer, essentially the same as the material disclosed above with respect to the gel electrolyte. The electrolyte material in the gel anode film may be present at an amount essentially the same as disclosed above with respect to the gel electrolyte. The gel electrolyte film may comprise dimensions of length, width, and thickness. The dimensions of the gel electrolyte films may be essentially the same as the respective dimension of the gel anode film or the gel cathode film. In some embodiments, each of the cathode, anode, and electrolyte films have similar dimensions and are substantially co-extensive with one another such that there is minimal overlap.

The electrochemical cell may further comprise an optional coating 1040. In one embodiment, the coating 1040 may comprise one or more of a sugar or a gelatin. The coating may also comprise other components, including, without limitation, odorants, colorants, flavorants, stabilizers, fillers, binders, and preservatives. In one embodiment, the thickness may be about 0.01 inches (0.025 cm).

Although FIG. 10 illustrates an embodiment in which three gel film components form the electrochemical cell, in another embodiment, the electrolyte material may also be incorporated into the gel anode film 1010. In such an embodiment, a separate gel electrolyte film, 1020, may not be needed. In another embodiment, the electrolyte material may also be incorporated into the gel cathode film 1030. In such an embodiment, a separate gel electrolyte film 1020 may not be needed.

It may be appreciated that the electrochemical cell 1000 may be configured to produce an electrical current when the cell is hydrated. Alternatively, if the electrochemical cell comprises a coating, the gel electrochemical cell may require being macerated in addition to being hydrated to produce an electrical current. In another embodiment, the electrochemical cell may merely require maceration to produce an electrical current. In some embodiments, the gel material may simply dissolve upon exposure to moisture e.g. from saliva or may melt or dissolve upon heating from e.g. body heat. When melted or dissolved, the various components come into operative contact with one another.

Figure 11:
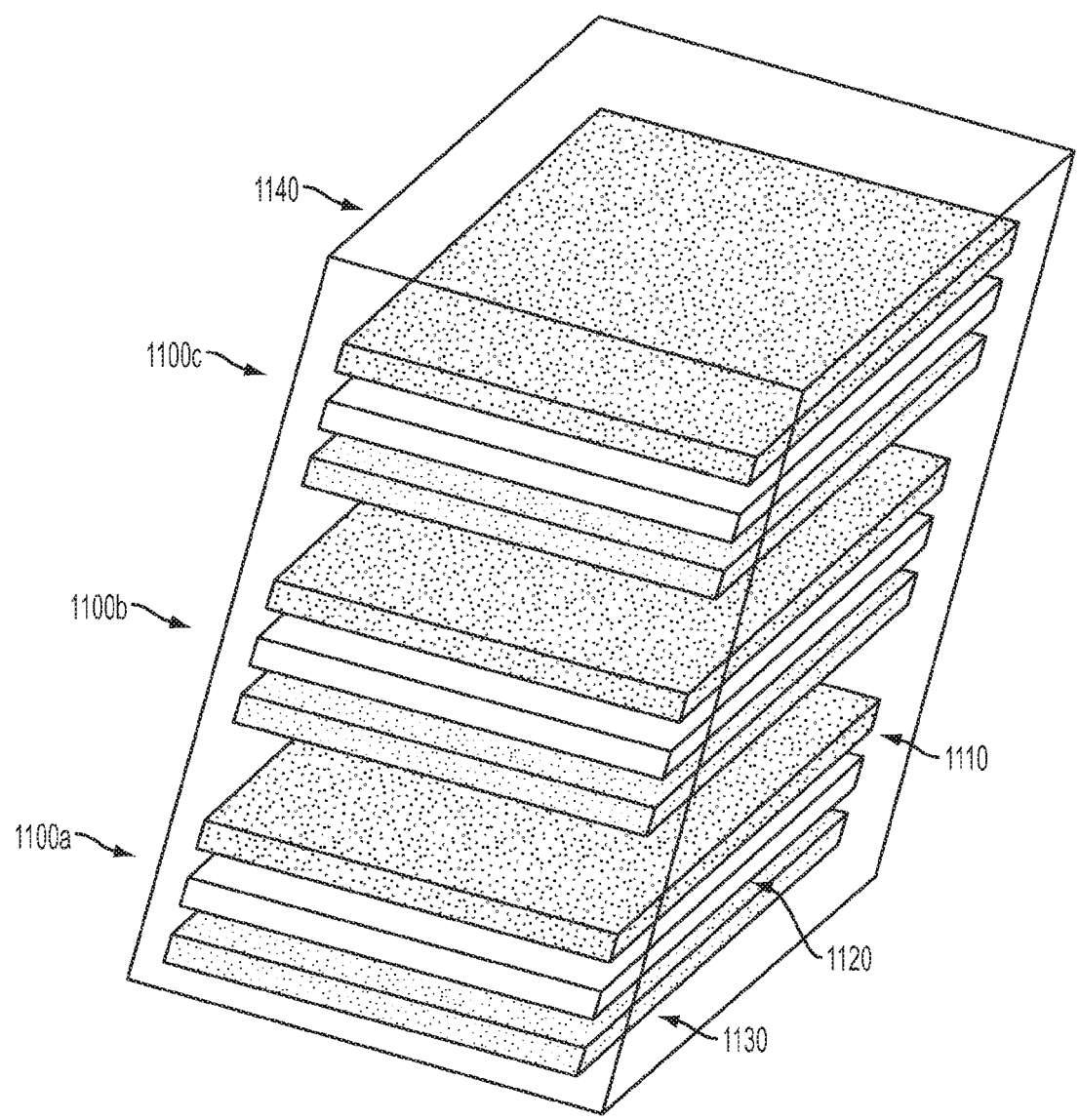
FIG. 11 illustrates yet another embodiment of a gel battery in accordance with the present disclosure.

FIG. 11 illustrates an embodiment of an electrochemical device comprising a number of individual electrochemical cells, 1100a-c, such as illustrated in FIG. 10, and as disclosed above. Each electrochemical cell may comprise a gel anode film 1110, a gel cathode film 1130, and a gel electrolyte film 1120, in which at least a portion of each gel anode film may contact a portion of an electrolyte film within an electrochemical cell, and at least a portion of each gel cathode film may contact the gel electrolyte film within the same electrochemical cell. In addition, the entire electrochemical device may further comprise a coating 1140 that encloses the device and its component electrochemical cells. In one embodiment, the coating 1140 may comprise the materials disclosed above with respect to coating 1040 of FIG. 10. The thickness of coating 1140 may be about 0.01 inches (0.025 cm). It may be understood that the electrochemical cell illustrated in FIG. 11, including its components and optional coating, may all be non-toxic for an application to an animal such as a human. It may be appreciated that an electrical potential generated by such an electrochemical device illustrated in FIG. 11 may depend on the number of electrochemical cells that comprise it. In one embodiment, the number of electrochemical cells may be about 1 to about 3. Examples of the number of electrochemical cells may include 1, 2, and 3. Thus, for example, if the electrical potential between the gel anode film and the gel cathode film in a gel film electrochemical cell is about 1V, then the voltage across an electrochemical device comprising three such cell in series, would have about three times the potential, or about 3V. It may be apparent that the total voltage potential across an electrochemical device may be adjusted according to the number of cells placed in series in the device.

Figure 12:
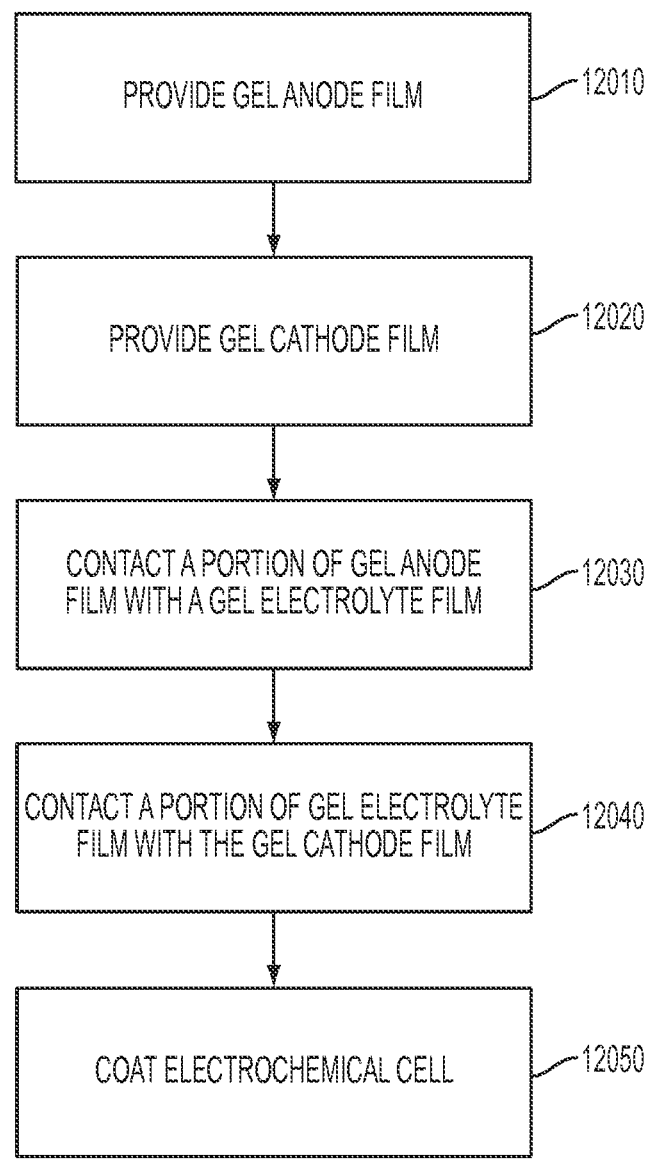
FIG. 12 is a flow diagram of an embodiment of fabricating a gel battery in accordance with the present disclosure.

FIG. 12 is a flow chart of an embodiment of a method of fabricating an electrochemical cell. A gel anode film may be provided 12010 in one fabrication step. The gel anode film may be provided by contacting an anode material, a first gel, and water to form a wet anode mixture. The mixture may be vacuum sealed and refrigerated until a wet anode film is produced. Once the wet anode film is produced, it may be dried, cut, and stored for further use. The wet anode film may be fabricated by any means, including without limitation, casting, spreading, rolling out, molding, spray coating, and printing through the use of an ink jet printer with liquid electrode or electrolyte in the place of ink The anode material may comprise an anode compound, and additional materials such as odorants, colorants, and similar as disclosed above. The first gel may comprise gel materials such as food-grade polymers also as disclosed above.

In an alternative embodiment, the wet gel anode film may be contacted with a calcium solution, such as calcium chloride or calcium lactate. The calcium salt solution may have a calcium concentration of about 30 mM to about 300 mM. In one embodiment, the solution may be about 45 mM calcium chloride. In another embodiment, the solution may be about 230 mM calcium lactate. Examples of the concentration of the calcium salt solution may include 35 mM, 40 mM, 50 mM, 75 mM, 100 mM, 125 mM, 150 mM, 175 mM, 200 mM, 225 mM, 250 mM, 275 mM, 300 mM, and ranges between any two of these values. In one embodiment, contacting comprises coating with. In another embodiment, contacting comprises spraying. The gel material with the calcium infusion may then be allowed to fix for about 1 to 2 minutes to form a firmer film. The fixed film may be briefly heated to dry, or air dried.

In similar manner to the production of the gel anode film, a gel cathode film may also be provided 12020. The gel cathode film may be provided by contacting a cathode material, a second gel, and water to form a wet cathode mixture. The mixture may be vacuum sealed and refrigerated until a wet cathode film is produced. Once the wet cathode film is produced, it may be dried, cut, and stored for further use. The wet cathode film may be fabricated by any means, including without limitation, casting, spreading, rolling out, molding, spray coating, and printing through the use of an ink jet printer. The cathode material may comprise a cathode compound, and additional materials such as odorants, colorants, and similar as disclosed above. The second gel may comprise gel materials such as food-grade polymers also as disclosed above. As disclosed above with respect to the anode film, the cathode film may also be contacted with a calcium solution and heated or allowed to dry.

At least a portion of the gel anode film may then be placed in contact with a gel electrolyte film 12030. The gel electrolyte film may be provided by contacting an electrolyte material, a third gel, and water to form a wet electrolyte mixture. The mixture may be vacuum sealed and refrigerated until a wet electrolyte film is produced. Once the wet electrolyte film is produced, it may be dried, cut, and stored for further use. The wet electrolyte film may be fabricated by any means, including without limitation, casting, spreading, rolling out, molding, spray coating, and printing through the use of an ink jet printer. The electrolyte material may comprise an electrolyte compound, and additional materials such as odorants, colorants, and similar as disclosed above. The third gel may comprise gel materials such as food-grade polymers also as disclosed above. As disclosed above with respect to the anode film, the electrolyte film may also be contacted with a calcium solution and heated or allowed to dry.

At least a portion of the gel cathode film may then be placed in contact with the gel electrolyte film 12040, thereby forming an electrochemical cell similar to 1000 in FIG. 10. Alternatively, the electrochemical cell fabricated in this manner may be further coated 12050 using a coating material as disclosed above.

It may be understood that the order in which the individual films—anode films, cathode films, and electrolyte films—are fabricated in FIG. 12 is arbitrary, and that FIG. 12 does not imply any restriction on the order of their fabrication.

It is further understood, that the method as illustrated in FIG. 12 is not restricted to a single three-layer electrochemical cell. For example, multiple anode films may contact each other, multiple electrolyte films may contact each other, and multiple cathode films may contact each other. Alternatively, steps 12010 through 12040 may be repeated. Thus, a three-layer cell comprising an anode film an electrolyte film, and a cathode film, may serve as a base on which another three-layer cell may be constructed. A second three-layer cell may contact a first three-layer cell in which the anode of a first cell may be in contact with a cathode of a second cell. In this manner, an electrochemical device comprising multiple three-layer electrochemical cells similar to that disclosed in FIG. 11 may be fabricated.

Figure 13:
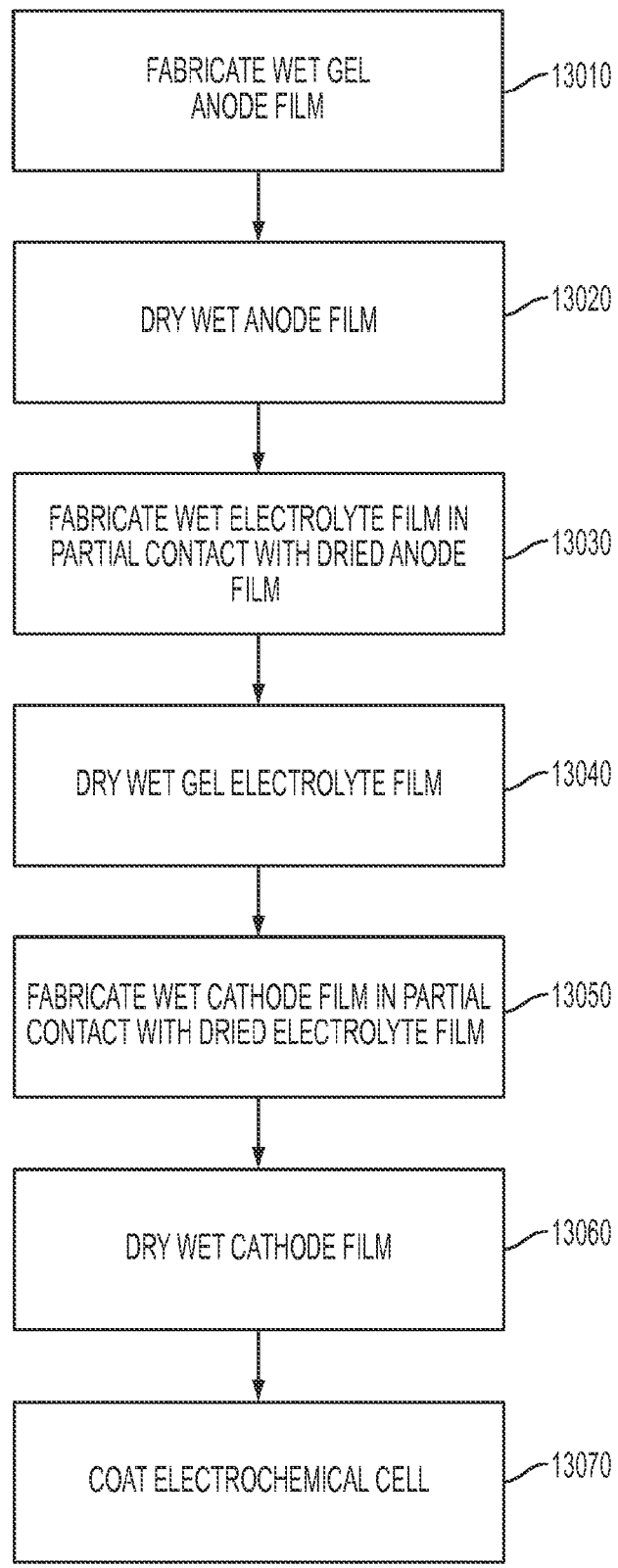
FIG. 13 is a flow diagram of another embodiment of fabricating a gel battery in accordance with the present disclosure.

FIG. 13 is a flow chart of another embodiment of a method of fabricating an electrochemical cell. A gel anode film may be provided 13010 in one fabrication step. The gel anode film may be provided by contacting an anode material, a first gel, and water to form a wet anode mixture. The mixture may be vacuum sealed and refrigerated until a wet anode film is produced. Once the wet anode film is produced, it may be dried 13020. The wet anode film may be fabricated by any means, including without limitation, casting, spreading, rolling out, molding, spray coating, and printing through the use of an ink jet printer. The anode material may comprise an anode compound, and additional materials such as odorants, colorants, and similar as disclosed above. The first gel may comprise gel materials such as food-grade polymers also as disclosed above. As disclosed above the anode film may also be contacted with a calcium solution and heated or allowed to dry.

At least a portion of a wet gel electrolyte film may then be placed in at least in partial contact with the dried gel anode film 13030. The gel electrolyte film may be provided by contacting an electrolyte material, a second gel, and water to form a wet electrolyte mixture. The mixture may be vacuum sealed and refrigerated until a wet electrolyte film is produced. The wet electrolyte film may be fabricated so that it at least partially contacts the dried anode film, for example by fabricating the wet electrolyte film on top of the dried anode film. The wet electrolyte film may be fabricated by any means, including without limitation, casting, spreading, rolling out, spray coating, and printing through the use of a ink jet printer. The electrolyte material may comprise an electrolyte compound, and additional materials such as odorants, colorants, and similar as disclosed above. The second gel may comprise gel materials such as food-grade polymers also as disclosed above. The wet electrolyte film may then be dried 13040. As disclosed above with respect to the anode film, the electrolyte film may also be contacted with a calcium solution before drying.

In similar manner to the production of the gel electrolyte film, a gel cathode film may also be provided 13050. The gel cathode film may be provided by contacting a cathode material, a third gel, and water to form a wet cathode mixture. The mixture may be vacuum sealed and refrigerated until a wet cathode film is produced. The wet cathode film may be fabricated so that it at least partially contacts the dried electrolyte film, for example by fabricating the wet cathode film on top of the dried electrolyte film. The wet cathode film may be fabricated by any means, including without limitation, casting, spreading, rolling out, spray coating, and printing through the use of an ink jet printer. The cathode material may comprise a cathode compound, and additional materials such as odorants, colorants, and similar as disclosed above. The second gel may comprise gel materials such as food-grade polymers also as disclosed above. The wet cathode film may then be dried 13060. As disclosed above with respect to the anode film, the cathode film may also be contacted with a calcium solution before drying.

According to this embodiment, an electrochemical cell similar to 1000 in FIG. 10 may be fabricated. Alternatively, the electrochemical cell fabricated in this manner may be further coated 12070 using a coating material as disclosed above.

It may be understood that the order in which the individual films—anode films, cathode films, and electrolyte films—are fabricated in FIG. 13 is not restrictive. For example, the gel cathode film may be fabricated first, followed by the fabrication of the gel electrolyte film and then the gel anode film.

It is further understood, that the method as illustrated in FIG. 13 is not restricted to a single three-layer electrochemical cell. For example, multiple anode films may contact each other, multiple electrolyte films may contact each other, and multiple cathode films may contact each other. Alternatively, steps 13010 through 13060 may be repeated. Thus, a three-layer cell comprising an anode film an electrolyte film, and a cathode film, may serve as a base on which another three-layer cell may be constructed. A second three-layer cell may contact a first three-layer cell in which the anode of a second cell may be in contact with the cathode of a first cell. In this manner, an electrochemical device comprising multiple three-layer electrochemical cells similar to that disclosed in FIG. 11 may be fabricated.

It may be appreciated that the gel electrochemical devices as disclosed above may be combined with any number or type of possibly non-toxic carrier medium to compose a consumable product for an animal. While types of consumable products are disclosed below with reference to consumption by humans, it is understood that these consumable products are not limited to humans, but may be, by extension, used by other animals.

In one embodiment, a consumable product may comprise at least one gel anode and at least one gel cathode. In another embodiment, the consumable product may also comprise at least one gel electrolyte. Any one or more of the electrochemical cell components may be present as a gel film, including the gel anode, the gel cathode, and/or the gel electrolyte. Further, any one or more of the electrochemical cell components may have a coating. The coating may be applied independently to any one of the gel electrolyte components, such as the anode, the cathode, and/or the electrolyte. Alternatively, a coating may be provided to any combination of cell components, including, without limitation, to a combination of the gel anode plus gel electrolyte, the gel cathode and the gel electrolyte, or to the gel anode plus electrolyte plus cathode. If multiple components have a coating, they may each be coated with the same material. Alternatively, a coating for one component, as for example a gel electrolyte film, may have a different composition than a coating for another component, as for example a gel cathode film.

The carrier material may comprise a liquid, a gel, or a solid. Depending on the carrier material, the electrochemical cell or cells may be mixed in (such as a gel carrier), placed or affixed on (such as a solid carrier), or incorporated into (such as a liquid, a gel, or a solid carrier). Non-limiting embodiments of the carrier may include a paste, a lotion, an ointment, and/or a food-stuff. Examples of such carriers may include a dentifrice, a dermal moisturizing lotion, a dermal anti-abrasion lotion, a dermal wound-care ointment, a shampoo, and a snack food. Depending on the type of carrier, the consumption of the product may include eating, drinking, and/or applying the product to a tissue. Non-limiting examples of such consumption may further include applying or rubbing the product into the skin or scalp, coating the hair with the product, and brushing teeth with the product.

In one embodiment, a gel electrochemical device comprising small coated strips comprising a gel anode film, a gel electrolyte film, and a gel cathode film together, may be incorporated into a mouth wash. In one embodiment, a dentifrice may comprise individual amounts of a gel anode, a gel cathode, and a gel electrolyte. The electrochemical cell may then become activated when a human brushes his or her teeth with the dentifrice, thereby combining the electrochemical cell components to form the electrochemical device. In one embodiment, a solid carrier, such as a potato chip, may have a gel anode film and a gel cathode film placed on opposite sides of the chip. In such an embodiment, the chip itself may act as an electrolyte to complete an electrochemical device; additionally, either one or both of the anode film and cathode film may be coated with a material.

EXAMPLES

The present compositions and methods will be understood more readily by reference to the following examples, which are provided by way of illustration and are not intended to be limiting in any way.

Example 1

Treatment of Dry Mouth

A gel battery can be used as a treatment of dry mouth. A housing can include a gel anode chamber, a gel cathode chamber, and a gel electrolyte chamber. Alternatively, the electrolyte may be incorporated into one or both of the gel anode or the gel cathode. Pressing on an actuator of the housing can release a portion of the gel anode, a portion of the gel cathode, and a portion of the gel electrolyte that come into contact with one another upon exiting the housing to create the gel battery. The gel battery can be administered orally to increase saliva production and secretion levels compared to the levels prior to the creation and administration of the gel battery. The gel battery, therefore, will be useful in treating dry mouth. In one embodiment, the gel battery may be incorporated into a food product such as a candy, a preserve, a cheese, etc. and used to treat dry mouth upon ingestion of the food product.

Example 2

Antiperspirant

A gel anode includes cosmetic grade aluminum and a gel cathode includes cosmetic grade carbon. The gel anode also includes sodium chloride that acts as an electrolyte. The gel anode and the gel cathode or stored in an anode chamber and a cathode chamber, respectively. Both of the chambers are housed in a gel antiperspirant container. The container includes an actuator that forces a portion of the gel anode and the gel cathode through a top of the container. Applying the gel anode and the gel cathode to an underarm causes a portion of the gel anode and the gel cathode to come into contact to create a gel battery. The gel battery results in current flowing through the underarm and results in a reduction in the amount of sweat produced by a subject compared to the amount of sweat produced prior to the application of the gel battery. The aluminum-based complexes may aid in the formation of plugs in sweat glands, and thus, can help prevent perspiration. The aluminum-based complexes may also interact with keratin fibrils in sweat ducts and form a physical plug that prevents sweat from reaching the surface of skin.

Example 3

Lotion

A collapsible tube includes a manifold dispensing nozzle that creates multiple gel batteries in series with one another. The manifold dispensing nozzle is created using three dimensional printing. The manifold dispensing nozzle can include an anode manifold that is in fluid communication with the anode chamber. The manifold dispensing nozzle can also include a cathode manifold and an electrolyte manifold that are in fluid communication with the cathode chamber and the electrolyte chamber, respectively. The anode, electrolyte, and the cathode manifolds can interleave portions of the gel anode, the gel electrolyte, and the gel cathode together to form two or more gel batteries in series with one another. In another embodiment, the manifold dispensing nozzle can include an anode dispensing channel and a cathode dispensing channel. In this embodiment, the gel anode and/or the gel cathode can include an electrolyte. In another embodiment, the manifold dispensing nozzle can include an anode dispensing channel, an electrolyte dispensing channel, and a cathode dispensing channel.

The manifold dispensing channel can also dispense a payload, such as a lotion. In one embodiment, the payload is between a gel anode and a gel cathode that contacts a subject's skin. In this embodiment, one or more batteries may be dispensed between the gel anode and the gel cathode that contacts the subject's skin In another embodiment, the one or more batteries between the gel anode and the gel cathode that contact the skin of a subject are sandwiched between two layers of the payload. This allows the subject to apply the payload without concern regarding the orientation of the payload and the gel batteries.

Example 4

Shampoo

A dispenser can include an anode chamber and a cathode chamber. The gel anode and/or the gel cathode includes an electrolyte. Additionally, the gel anode and/or the gel cathode includes a shampoo. The gel anode and the gel cathode are dispensed from the dispenser and combined upon being dispensed. Portions of the gel anode and gel cathode continue to be connected as the shampoo is massaged into a subject's hair to form one or more gel batteries. Electrical current from the gel batteries flow through the subject's hair and scalp and help the shampoo remove oil, dirt, dandruff, contaminants, etc from the subject's hair. Such stimulation will also have the beneficial effective of providing stimulation and a pleasant sensation to a subject's scalp and other body areas.

Example 5

A Gel Film Electrochemical Cell and Method for Making Same

About 1.5 w:w % compared to water of copper gluconate was blended together with about 1.7 w:w % of glycerin, about 1.1 w:w % of lemon essential oil to form a wet cathode mixture. About 3.5 w:w % of maltodextrin DE8 was dry blended into the wet cathode mixture. Additionally, about 3.8 w:w % of sodium alginate, and 1.4 w:w % of carageenan were combined with the wet cathode mixture by slow whisking. The final wet cathode gel material was vacuum sealed and refrigerated for about 8 hours. A wet anode material was fabricated using about 1.5% w:w versus water of finely divided zinc metal in a similar mixture. A wet electrolyte material was fabricated using about 1.5% w:w versus water of citric acid in a similar mixture. Thereafter, each wet gel film material, anode, cathode, and electrolyte, were rolled out on a flat surface of glass to about a 0.01 inch (0.025 cm) thickness. The wet gel films were allowed to dry at ambient temperature for about 24 hours. The resulting films were sliced with a razor blade to form squares about 0.1 inch (0.25 cm) by 0.1 inch (0.25 cm) and removed by scraping the films off the flat surface. The gel anode, gel cathode, and gel electrolyte films were combined using a single layer of a gel anode film placed on top of a gel electrolyte film, with a gel cathode film placed underneath the gel electrolyte film. The complete structures were packaged in individual sealed pouches to prevent moisture from contacting the gel film battery.

Example 6

A Method for Making a Film Electrochemical Cell

A wet anode material comprising about 1.5% by weight of finely divided zinc powder was mixed with a carrying vehicle. A wet cathode material comprising about 1.5% by weight of copper gluconate was mixed with a carrying vehicle. About 1.5% by weight of citric acid was also mixed with a carrying vehicle. Each of the electrochemical cell materials—anode, cathode, and electrolyte—was loaded into a separate cartridge used for an ink jet printer. About 34.7 µl of the material was loaded into each cartridge. The printer was programmed to fabricate a strip about 5.4 in (13.7 cm.) long and about 1 in. (2.54 cm.) wide on a piece of photo glossy paper. The individual strips were estimated to be about 0.07 µm thick. Each type of wet film, anode, cathode, an electrolyte, was permitted to dry under ambient conditions for about 24 hours to form the equivalent dry film.

Example 7

A Method for Making a Film Electrochemical Cell

A wet gel anode material, wet gel cathode material, and wet gel electrolyte material may be fabricated as disclosed above in Example 5. Each of the wet gel materials may then be loaded into a separate ink jet cartridge used for an ink jet printer. In one embodiment, the volume of wet gel material in a cartridge may be about 34.7 µl. The printer may then be programmed to fabricate a strip about 5.4 in (13.7 cm.) long and about 1 in. (2.54 cm.) wide on a piece of photo glossy paper. The strip may be about 0.07 µm thick. Each type of wet film, anode, cathode, an electrolyte, may be permitted to dry under ambient conditions for about 24 hours to form the dry film. If a thicker film is desired, the printer may be programmed to apply a second strip of material on top of the first. Gel films of a variety of thicknesses may thus be fabricated depending on the number of iterations of printing provided. The dried gel films, comprising separate anode films, electrolyte films, and cathode films, may then be assemble to form an electrochemical cell or device.

It may be understood that a wet anode gel film may be laid down using an ink jet printer as disclosed above, and that a film of a gel electrolyte material may be printed over the gel anode film once the anode film has dried. Similarly, a gel cathode film may be printed over the electrolyte film after the electrolyte film has dried. If multiple cells are required, the process may be repeated by sequentially printing gel anode layers, gel electrolyte layers, and gel cathode layers.

Example 8

Gel Battery Components and Methods of Making Same

A gel anode was fabricated by mixing water with about 6% w:w finely divided zinc power (anode material), about 1.7% w:w glycerin (a food-grade polymer), and about 3.8% w:w sodium alginate (a food-grade polymer). A gel cathode was fabricated by mixing water with about 6% w:w copper gluconate (cathode material), about 1.7% w:w glycerin (a food-grade polymer), and about 3.8% w:w sodium alginate (a food-grade polymer). A separate gel electrolyte was fabricated by mixing water with about 6% w:w citric acid (electrolyte material), about 1.7% w:w glycerin (a food-grade polymer), and about 3.8% w:w sodium alginate (a food-grade polymer).

In use, at least the gel anode and gel cathode may be kept separate until the desired voltaic activity is desired. When desired, the gel anode and gel cathode—along with the separate gel electrolyte if required—may be brought into contact with each other to induce an organoleptic effect when in contact with one or more body tissues.

Example 8

A Method of Using a Gel Film Electrochemical Cell

A gel anode film and a gel cathode film may be fabricated essentially the same way as disclosed in Example 5, above. Each film may be separately coated with a glycerin-containing coating. A number of cathode films may be fixed on one side of a potato-chip, and a number of anode films may be fixed on the opposite side of the potato-chip. When the chip is macerated, the salt in the potato chip may act as an electrolyte and the saliva may hydrate the anode film and the cathode film to produce the appropriate effect.

Example 9

A Gel Film Electrochemical Cell and Method for Using Same

A gel anode film, a gel cathode film, and a gel electrolyte film were fabricated essentially the same way as disclosed in Example 5, above. The films were assembled into at least a three-layer electrochemical cell structure of anode film/electrolyte film/cathode film. In one example, a crisped rice and marshmallow treat was sliced open with a small knife and an amount of electrochemical cells equivalent to about 0.1 mg copper compound and about 0.1 mg zinc compound was introduced. The treat was then reassembled and compressed to seal. In another example, a caramel candy was similarly sliced open and an amount of electrochemical cells equivalent to about 0.2 mg copper compound and about 0.2 mg zinc compound was introduced. In yet another example, an amount of electrochemical cells equivalent to about 0.1 mg copper compound and about 0.1 mg zinc compound was incorporated into a breath freshening strip.

Example 10

Methods of Using a Gel Electrochemical Cell

In other examples, gel anode and gel cathode components were fabricated in essentially as disclosed above. Amounts of the gel anode and gel cathode components were introduced into a variety of food-stuffs. For jelly, an amount of cathode material equivalent to about 0.1 mg copper compound and an amount of anode material equivalent to about 0.1 mg zinc compound were added to about a tablespoon (15 ml) of the jelly. For yoghurt, an amount of cathode material equivalent to about 0.1 mg copper compound and an amount of anode material equivalent to about 0.1 mg zinc compound were added to about a tablespoon (15 ml) of the yoghurt. For peanut butter, an amount of cathode material equivalent to about 0.1 mg copper compound and an amount of anode material equivalent to about 0.1 mg zinc compound were added to about a tablespoon (15 ml) of the peanut butter. For mustard, an amount of cathode material equivalent to about 0.1 mg copper compound and an amount of anode material equivalent to about 0.1 mg zinc compound were added to about a tablespoon (15 ml) of the mustard. In another example, an amount of cathode material equivalent to about 0.75 mg copper compound and an amount of anode material equivalent to about 0.78 mg zinc compound were added to about a stick of chewing gum.

Example 11

Methods of Using a Gel Electrochemical Cell

In another example, gel anode and gel cathode components were fabricated as essentially disclosed above. An amount of cathode material equivalent to about 0.75 mg copper compound and an amount of anode material equivalent to about 0.75 mg zinc compound were added to about a teaspoon (5 ml) of a commercially available toothpaste.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated in this disclosure, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds, or compositions, which can, of course, vary. It is also to be understood that the terminology used in this disclosure is for the purpose of describing particular embodiments only, and is not intended to be limiting.

With respect to the use of substantially any plural and/or singular terms in this disclosure, those having skill in the art can translate from the plural to the singular and/or from the singular to the plural as is appropriate to the context and/or application. The various singular/plural permutations may be expressly set forth in this disclosure for sake of clarity. It will be understood by those within the art that, in general, terms used in this disclosure, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). While various compositions, methods, and devices are described in terms of "comprising" various components or steps (interpreted as meaning "including, but not limited to"), the compositions, methods, and devices can also "consist essentially of" or "consist of" the various components and steps, and such terminology should be interpreted as defining essentially closed-member groups.

It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

As will be understood by one skilled in the art, for any and all purposes, such as in terms of providing a written description, all ranges disclosed in this disclosure also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed in this disclosure can be readily broken down into a lower third, middle third and upper third, etc. As will also be understood by one skilled in the art all language such as "up to," "at least," and the like include the number recited and refer to ranges which can be subsequently broken down into subranges as discussed above. Finally, as will be understood by one skilled in the art, a range includes each individual member.

From the foregoing, it will be appreciated that various embodiments of the present disclosure have been described for purposes of illustration, and that various modifications may be made without departing from the scope and spirit of the present disclosure. Accordingly, the various embodiments disclosed are not intended to be limiting, with the true scope and spirit being indicated by the following claims.

What is claimed is:

1. An electrochemical cell comprising:
a gel anode;
a gel cathode; and
a gel electrolyte, wherein
at least a portion of the gel anode is in physical contact with at least a portion of the gel electrolyte,
at least a portion of the gel cathode is in physical contact with at least a portion of the gel electrolyte, and
the electrochemical cell, the gel anode, the gel cathode, and the gel electrolyte comprise one or more of a food grade product and a cosmetic grade material.

2. The electrochemical cell of claim 1, wherein any one or more of the gel anode, the gel cathode, or the gel electrolyte further comprises a food-grade polymer.

3. The electrochemical cell of claim 1, wherein any one or more of the gel anode, the gel cathode, or the gel electrolyte further comprises one or more of: an odorant, a colorant, a flavorant, a stabilizer, a filler, a binder, and a preservative.

4. The electrochemical cell of claim 1, wherein the electrochemical cell is configured to produce an electric current when the electrochemical cell is hydrated.

5. The electrochemical cell of claim 1, wherein the gel anode comprises one or more of: zinc metal powder, aluminum metal powder, and magnesium metal powder.

6. The electrochemical cell of claim 1, wherein an amount of an anode compound in the gel anode is about 0.5% by weight compared to a gel material in the gel anode to about 6% by weight compared to the gel material.

7. The electrochemical cell of claim 1, wherein the gel cathode comprises one or more of a copper salt.

8. The electrochemical cell of claim 1, wherein an amount of a cathode compound in the gel cathode is about 0.5% by weight compared to a gel material in the gel cathode to about 6% by weight compared to the gel material.

9. The electrochemical cell of claim 1, wherein the gel electrolyte comprises one or more of: ascorbic acid, phosphoric acid, and a salt.

10. The electrochemical cell of claim 1, wherein an amount of an electrolyte compound in the gel electrolyte is about 0.5% by weight compared to a gel material in the gel electrolyte to about 6% by weight compared to the gel material.

11. The electrochemical cell of claim 1, wherein in contact with comprises one or more of: mixed with, macerated with, anointed with, applied with, wiped with, and spread with.

12. An electrochemical cell comprising:
a gel anode film;
a gel cathode film; and
a gel electrolyte film, wherein
at least a portion of the gel anode film is in physical contact with at least a portion of the gel electrolyte film,
at least a portion of the gel cathode film is in physical contact with at least a portion of the gel electrolyte film, and
the electrochemical cell, the gel anode film, the gel cathode film, and the gel electrolyte film comprise one or more of a food grade product and a cosmetic grade material.

13. The electrochemical cell of claim 12, further comprising a coating configured to cover the electrochemical cell.

14. The electrochemical cell of claim 13, wherein the electrochemical cell is configured to produce an electric current between the cathode film and the anode film when the coating is macerated and the electrochemical cell is hydrated.

15. The electrochemical cell of claim 12, wherein the electrochemical cell is configured to produce an electric current between the cathode film and the anode film when the electrochemical cell is hydrated.

16. The electrochemical cell of claim 12, wherein the electrochemical cell is configured to produce an electric current between the cathode film and the anode film when the electrochemical cell is macerated.

17. The electrochemical cell of claim 12, wherein any one or more of the gel anode film, the gel cathode film, or the gel electrolyte film is about 0.025 cm to about 0.062 cm thick.

18. The electrochemical cell of claim 12, wherein any one or more of the gel anode film, the gel cathode film, or the gel electrolyte film is about 0.25 cm to about 25 cm long.

19. The electrochemical cell of claim 12, wherein any one or more of the gel anode film, the gel cathode film, or the gel electrolyte film is about 0.25 cm to about 25 cm wide.

* * * * *

UNITED STATES PATENT AND TRADEMARK OFFICE
CERTIFICATE OF CORRECTION

| | | |
|---|---|---|
| PATENT NO. | : 8,735,001 B2 | Page 1 of 1 |
| APPLICATION NO. | : 13/816366 | |
| DATED | : May 27, 2014 | |
| INVENTOR(S) | : Godden | |

It is certified that error appears in the above-identified patent and that said Letters Patent is hereby corrected as shown below:

In the Specification

In Column 5, Lines 2-3, delete "gel anode 115" and insert -- gel anode 110 --, therefor.

In Column 5, Line 17, delete "cathode chamber 115," and insert -- cathode chamber 135, --, therefor.

In Column 5, Line 18, delete "anode chamber 135" and insert -- anode chamber 115 --, therefor.

In Column 7, Line 6, delete "520, and 520." and insert -- 520, and 530. --, therefor.

In Column 7, Lines 22-23, delete "electrolyte chamber 120," and insert -- electrolyte chamber 125, --, therefor.

In Column 13, Line 59, delete "gel electrolyte film 920" and insert -- gel electrolyte film 1020 --, therefor.

In Column 15, Line 12, delete "ink The" and insert -- ink. The --, therefor.

In Column 16, Line 53, delete "a ink" and insert -- an ink --, therefor.

In Column 17, Line 17, delete "12070" and insert -- 13070 --, therefor.

In Column 19, Line 44, delete "skin In" and insert -- skin. In --, therefor.

In Column 20, Line 11, delete "carageenan" and insert -- carrageenan --, therefor.

Signed and Sealed this
Sixteenth Day of September, 2014

Michelle K. Lee
*Deputy Director of the United States Patent and Trademark Office*